United States Patent
Vlasopoulos et al.

(10) Patent No.: US 10,793,764 B2
(45) Date of Patent: Oct. 6, 2020

(54) LOW DENSITY CEMENTITIOUS COMPOSITIONS FOR USE AT LOW AND HIGH TEMPERATURES

(71) Applicant: LAFARGE, Paris (FR)

(72) Inventors: Nikolaos Vlasopoulos, Lyons (FR); Jeffrey Chen, Zürich (CH)

(73) Assignee: HOLCIM TECHNOLOGY LTD, Jona (CH)

( * ) Notice: Subject to any disclaimer, the term of this patent is extended or adjusted under 35 U.S.C. 154(b) by 15 days.

(21) Appl. No.: 15/568,294

(22) PCT Filed: Apr. 22, 2016

(86) PCT No.: PCT/EP2016/058969
§ 371 (c)(1),
(2) Date: Oct. 20, 2017

(87) PCT Pub. No.: WO2016/170092
PCT Pub. Date: Oct. 27, 2016

(65) Prior Publication Data
US 2018/0148628 A1    May 31, 2018

(30) Foreign Application Priority Data
Apr. 23, 2015 (EP) .................... 15305626

(51) Int. Cl.
*C09K 8/46* (2006.01)
*C04B 28/04* (2006.01)
*C09K 8/473* (2006.01)
*C04B 14/04* (2006.01)
*C04B 14/10* (2006.01)
*C04B 14/14* (2006.01)
*C04B 18/06* (2006.01)
(Continued)

(52) U.S. Cl.
CPC ............ *C09K 8/46* (2013.01); *C04B 14/04* (2013.01); *C04B 14/106* (2013.01); *C04B 14/14* (2013.01); *C04B 18/067* (2013.01); *C04B 18/08* (2013.01); *C04B 18/101* (2013.01); *C04B 18/146* (2013.01); *C04B 28/04* (2013.01); *C09K 8/473* (2013.01); *E21B 33/14* (2013.01); *C04B 2111/00215* (2013.01); *C04B 2111/40* (2013.01); *C04B 2201/20* (2013.01); *Y02W 30/92* (2015.05); *Y02W 30/94* (2015.05)

(58) Field of Classification Search
CPC . C09K 8/467; C09K 8/46; C09K 8/42; C09K 8/487; C09K 8/426; C09K 11/025; C09K 11/06; C09K 2208/08; C09K 2208/10; C09K 2211/1018; C09K 5/048; C09K 5/063; C09K 5/14; C09K 8/00; C09K 8/03; C09K 8/035; C09K 8/424; C09K 8/428; C09K 8/44; C09K 8/473; C09K 8/48; C09K 8/5083; E21B 33/14; E21B 47/0005; E21B 33/13; E21B 33/16; E21B 49/00; E21B 21/003; E21B 33/138; E21B 43/267; E21B 47/06; E21B 47/065; E21B 47/102
See application file for complete search history.

(56) References Cited

U.S. PATENT DOCUMENTS

2003/0000423 A1    1/2003  Vijn et al.
2010/0294496 A1*   11/2010 Woytowich ............. C04B 28/02
                                                        166/285
2012/0012315 A1    1/2012  Woytowich et al.
(Continued)

FOREIGN PATENT DOCUMENTS

JP    01275456       *  11/1989
KR    10-0912385 B1    8/2009
KR    100912385      *  8/2009

OTHER PUBLICATIONS

Applicants letter on Jun. 25, 2018 to the European Patent office, downloaded on Dec. 20, 2019.*
International Search Report as issued in International Patent Application No. PCT/EP2016/058969, dated Jul. 8, 2016.

* cited by examiner

*Primary Examiner* — Kumar R Bhushan
(74) *Attorney, Agent, or Firm* — Pillsbury Winthrop Shaw Pittman LLP

(57) ABSTRACT

A cementitious binder, includes a hydraulic binder in an amount in the range from 50 to 80% by weight of the cementitious binder; a first siliceous based material in an amount in the range from 0.5 to 35% by weight of the cementitious binder, the first siliceous based material having a $(SiO_2)/(Al_2O_3)$ ratio by weight greater than 2.5; a second siliceous based material in an amount in the range from 10 to 25% by weight of the cementitious binder, the second siliceous based material being different from the first siliceous based material and having (a) a $(SiO_2)/(Al_2O_3)$ ratio by weight greater than 10 and (b) a BET specific surface area greater than 5 $m^2/g$; and an aluminum based material in the range from 0 to 10% by weight of the cementitious binder and having a $(SiO_2)/(Al_2O_3)$ ratio by weight lower than 2.5, wherein $0.09 < Al_{EFF}/(Al_{EFF}+Si_{EFF}) < 0.28$, where $Al_{EFF}$=molar content of alumina aluminum in the hydraulic binder, and $Si_{EFF}$=molar content of silica in the first siliceous based material for particles having a size lower than 3 μm+molar content of silica in the second siliceous based material.

13 Claims, 8 Drawing Sheets

(51) Int. Cl.
    *C04B 18/08*     (2006.01)
    *C04B 18/10*     (2006.01)
    *C04B 18/14*     (2006.01)
    *E21B 33/14*     (2006.01)
    *C04B 111/40*    (2006.01)
    *C04B 111/00*    (2006.01)

(56) References Cited

U.S. PATENT DOCUMENTS

| | | | |
|---|---|---|---|
| 2015/0232388 A1* | 8/2015 | Dal Bo | C04B 28/04 106/726 |
| 2017/0204007 A1* | 7/2017 | Raz | C04B 28/08 |

LOW DENSITY CEMENTITIOUS COMPOSITIONS FOR USE AT LOW AND HIGH TEMPERATURES

CROSS-REFERENCE TO RELATED APPLICATIONS

This application is the U.S. National Stage of International Application Serial No. PCT/EP2016/058969, filed Apr. 22, 2016, which in turn claims priority to European Application No. 15305626.2, filed Apr. 23, 2015. The contents of all of these applications are incorporated herein by reference in their entirety.

The present invention relates to cement, concrete and mortar compositions and, more particularly, to low density cementitious compositions for use at low and high temperatures. The present invention also relates to methods of cementing.

Cementitious settable compositions are used in the treatment and drilling of well bores extending from the surface of the earth to subterranean formations. Generally, the drilling of a well for the recovery of oil, gas or water from a subterranean formation involves placing and securing a casing in the well bore by cementing. In this operation, cement is pumped downward from the surface of the earth to the bottom of the well and then in the space (annulus) in between the casing and the earth. After the cement slurry (i.e. also broadly referred to as a cementitious settable composition) has been pumped between the casing and the well, pumping is discontinued and the cement is permitted to set in place.

In cementing procedures in a well bore, it is sometimes desirable that the cement slurry has a low density, for example a density equal to or lower than 14 pounds per gallon (ppg) (1677.6 kg/m$^3$). High density cement slurries require higher pumping pressures in order to place them at the desired positions in the well bore and impose high static and dynamic pressures upon the formation to be treated. At the locations where these other formations are porous and/or weak (from a geo mechanical point of view), the high pressures exerted in the well bore can result in loss of the cement slurry into the formations and/or loss of the water from the cement slurry into the formations. As a result, the cement can set in an unintended position/depth in the well bore. Therefore, a lot of cementitious settable compositions will require to be prepared/mixed at low densities. Additionally, when designing cementitious settable compositions for subterranean applications, design engineers should ensure that the compositions provide adequate compressive strength and zonal isolation. Aside from providing strength and zonal isolation one should ensure that the selected compositions meet all regulatory guidelines for zonal isolation for the respective areas. Another area of concern is to ensure that the hardened cementitious settable composition selected to provide zonal isolation has the capability to be detected by down-hole interpretation methods (bond logs). Yet another area of concern from a manufacturing standpoint is to ensure that the cementitious settable composition remains uniform and stable.

There are three avenues that are routinely pursued to produce slurries or cementitious settable compositions with densities below 14 ppg (1677.6 kg/m$^3$), which are conventionally used to cement well bores.

The first avenue that can be pursued is to produce foamed cements by using foaming agents to introduce and stabilize a gas in a cement slurry. Foamed cements achieve good mechanical properties but require special equipment at the well site to inject the gas into the base slurry. Moreover, the use of foaming agents or other similar chemicals for reducing the density of cement slurries may create hazards and pose environmental concerns.

The second avenue that can be pursued is to use extenders to allow the use of an increased amount of water without segregation or bleeding. Typical examples of extenders are clays (bentonite or attapulgite), sodium silicate and pozzolans (fly ash, diatomite and silica fume). However, these systems achieve low mechanical properties for densities below 14 ppg (1677.6 kg/m$^3$) (typically lower than 1000 psi (6.9 MPa) psi at 180 F (83° C.) after 48 hours) and are normally used in applications where high slurry performance is not required.

Finally, the third avenue that can be pursued is to use lightweight particles, such as microspheres, expanded perlite, gilsonite or powdered coal, to reduce slurry density. These systems can achieve good mechanical and rheological performance which can be further increased (above 2000 psi (13.8 MPa) at 180 F (83° C.) after 24 h) by optimizing particle packing of constituents. However, their use is normally limited to low pressure applications due to the susceptibility of these lightweight particles to break and increase in density under high pressure. In addition, the systems with microspheres have high production costs.

U.S. Publication No. 2012/0012315 describes a binder containing a cementitious binder, silica fume, metakaolin, limestone and an accelerator. This binder can be used to produce cement slurries having a density between 11 ppg (1318 kg/m$^3$) and 13 ppg (1557.7 kg/m$^3$) by varying the amount of water added while maintaining good slurry stability and at least 500 psi (3.4 MPa) pressure at 24 hr and 100 F (38° C.). Cement slurries produced with this binder achieve good mechanical performance for a variety of applications up to 150 F, while at higher temperatures a decrease in compressive strength could be seen.

It is desirable to provide lightweight cementitious settable compositions or cement slurries that exhibit enhanced compressive performances while having the highest possible water content and can be used over a wide range of temperatures (e.g. between 100 F (38° C.) and 230 F (110° C.)) and for densities as low as 12 pounds per gallon (ppg) (1437.9 Kg/m$^3$) without using a lightweight additive. It is also desirable that the enhanced compressive performances remain stable over time. The high water content enables one to produce the lowest slurry weight, which then requires the lowest amount of lightweight additives to achieve the desired density. A lightweight additive is defined hereinafter as any material other than water that is used to provide a cement slurry that has a low density and desired mechanical and rheological properties. Examples of lightweight additives include microspheres, foaming agents and the like. It will be appreciated that any microspheres, foaming agents and the like added to the cementitious settable composition or cement slurry in an amount not sufficient to provide a low density and desired mechanical and rheological properties would not be considered a lightweight additive.

In particular, it is desirable to provide lightweight cementitious settable compositions that can be used over a wide range of temperatures (e.g. between 100 F (38° C.) and 230 F (110° C.)) and that exhibit enhanced short-term and long-term compressive performances at densities equal to or lower than 14 pounds per gallon (ppg) (1677.6 Kg/m$^3$) without using, or including a minimum amount of, lightweight additives such as microspheres, foaming agents or the like. Furthermore, it is desirable to provide cementitious settable compositions that can be used over a wide range of temperatures (e.g. between 100 F (38° C.) and 230 F (110° C.)) and that exhibit enhanced short-term and long-term compressive performances at densities equal to or lower than 13 ppg (1557.7 kg/m3), for example equal to or lower than 12 ppg (1437.9 kg/m3), without using, or including a minimum amount of, lightweight additives such as microspheres, foaming agents or the like. It is also desirable to provide cementitious settable compositions that can be used over a wide range of temperatures (e.g. between 100 F (38° C.) and 230 F (110° C.)) and that exhibit enhanced short-term and long-term compressive performances at densities lower than 11 ppg (1318 kg/m3) including a reduced amount of lightweight additives such as microspheres, foaming agents or the like. In addition, it is desirable to provide cementitious settable compositions that can be used over a wide range of temperatures (e.g. between 100 F (38° C.) and 230 F (110° C.)) and that exhibit enhanced short-term and long-term compressive performances at densities equal to or lower than 10 ppg (1198 kg/m3), preferably equal to or lower than 9 ppg (1078.4 kg/m3), more preferably equal to or lower than 8 ppg (958.6 kg/m3), including a minimum amount of lightweight additives such as microspheres, foaming agents or the like.

It was unexpectedly found that it is possible to produce a cementititous binder without using any microspheres which can achieve mechanical performances similar to other cements using microspheres (above 1500 psi (10.3 MPa)) for a wide range of temperatures, different types of water to produce the slurries, and densities as low as 12 ppg (1437.9 kg/m3). For example, the temperatures can be between 100 F (38° C.) and 230 F (110° C.). Moreover, the purity and salinity of the water to prepare the cement slurries can vary in various embodiments of the invention. The absence of lightweight additives allows this cementitious binder to be used in many different types of applications, such as high pressure/temperature applications unlike the cement slurry containing lightweight additives.

It was unexpectedly found that the high mechanical performances obtained with the cementitious binder according to an embodiment of the invention can be maintained over wide ranges of conditions (i.e. using different types of water (e.g. fresh water or seawater), using different quality materials, and over a wide range of temperatures (e.g. at temperatures between 100 F (38° C.) and 230 F (110° C.))) by controlling the $Al_{EFF}/(Al_{EFF}+Si_{EFF})$ ratio of the cementitious binder, which includes a hydraulic binder, a first siliceous based material, a second siliceous based material and an aluminum based material:

wherein $0.09<Al_{EFF}/(Al_{EFF}+Si_{EFF})<0.28$, where $Al_{EFF}$=molar content of aluminum in the hydraulic binder, and $Si_{EFF}$=molar content of silica in the first siliceous based material for particles having a size lower than 3 μm+molar content of silica in the second siliceous based material.

The first siliceous based material of the cementitious binder has a $(SiO_2)/(Al_2O_3)$ ratio by weight greater than 2.5 and is in an amount in the range from 0.5 to 35% by weight of the cementitious binder. The second siliceous based material (which is different from the first siliceous based material) of the cementitious binder is in an amount in the range from 10 to 25% by weight of the cementitious binder, the second siliceous based material being different from the first siliceous based material and has (a) a $(SiO_2)/(Al_2O_3)$ ratio by weight greater than 10 and (b) a BET specific surface area greater than 5 m²/g. The aluminum based material is in an amount in the range from 0 to 10% by weight of the cementitious binder and has a $(SiO_2)/(Al_2O_3)$ ratio by weight lower than 2.5

In particular, in an aspect of the invention, there is provided a manufactured cementitious binder comprising a hydraulic binder in an amount in the range from 50 to 80% by weight of the cementitious binder; a first siliceous based material in an amount in the range from 0.5 to 35% by weight of the cementitious binder, the first siliceous based material having a $(SiO_2)/(Al_2O_3)$ ratio by weight greater than 2.5; a second siliceous based material in an amount in the range from 10 to 25% by weight of the cementitious binder, the second siliceous based material being different from the first siliceous based material and having (a) a $(SiO_2)/(Al_2O_3)$ ratio by weight greater than 10 and (b) a BET specific surface area greater than 5 m²/g; and an aluminum based material in the range from 0 to 10% by weight of the cementitious binder and having a $(SiO_2)/(Al_2O_3)$ ratio by weight lower than 2.5, wherein $0.09<Al_{EFF}/(Al_{EFF}+Si_{EFF})<0.28$, where $Al_{EFF}$=molar content of aluminum in the hydraulic binder, and $Si_{EFF}$=molar content of silica in the first siliceous based material for particles having a size lower than 3 μm+molar content of silica in the second siliceous based material.

The manufactured cementitious binder produces a low density cementitious settable composition or cement slurry that has excellent well slurry properties such as low fluid loss, low free water, low segregation, adjustable thickening time, good admixture response, good rheology and high mechanical properties without using, or using little amounts of, lightweight additives. Specifically, the cementitious binder provides a cementitious settable composition, when added with water, having a density less than 14 pounds per gallon (ppg) (1677.6 kg/m³).

In an embodiment of the invention, the first siliceous based material is selected from the group consisting of slag, siliceous pozzolan, silica flour and mixtures thereof. Moreover, in an embodiment of the invention the second siliceous based material is selected from the group consisting of silica fume, precipitated silica, rice husk ash, and mixtures thereof. In yet another embodiment of the invention, the aluminum based material is selected from the group consisting of metakaolin, calcined clay, fly ash, aluminum based natural pozzolan and mixtures thereof. It will be appreciated that any mixtures of the above listed materials for the first siliceous based material, the second siliceous based material and the aluminum based material are encompassed by various embodiments of the present invention to the extent the relationship $0.09<Al_{EFF}/(Al_{EFF}+Si_{EFF})<0.28$ is satisfied by the mixtures.

In an embodiment of the invention, the hydraulic binder is in an amount in the range from 55 to 78% by weight of the cementitious binder and more preferably in the range from 58 to 75%.

In an embodiment of the invention, the first siliceous based material is in an amount in the range from 5% to 30%, preferably from 8 to 30% by weight of the cementitious binder and more preferably in the range from 10 to 25%. Moreover, in an embodiment of the invention, the first siliceous based material is in an amount greater than 0.5% by weight of the cementitious binder and up to 35% by weight of the cementitious binder.

In an embodiment of the invention, the second siliceous based material is in an amount in the range from 10 to 20%, preferably from 15% to 19%, by weight of the cementitious binder.

In an embodiment of the invention, the aluminum based material is in an amount in the range from 0 to 7% by weight of the cementitious binder. Moreover, in an embodiment of the invention, the aluminum based material is in an amount greater than 0.5% by weight of the cementitious binder and up to 10% by weight of the cementitious binder.

In an embodiment of the invention, the first siliceous based material, the second siliceous based material and the aluminum based material are encompassed by various embodiments of the present invention to the extent the relationship $0.09 < Al_{EFF}/(Al_{EFF}+Si_{EFF}) < 0.26$ is satisfied by the mixtures.

In a preferred embodiment of the invention, the first siliceous based material, the second siliceous based material and the aluminum based material are encompassed by various embodiments of the present invention to the extent the relationship $0.09 < Al_{EFF}/(Al_{EFF}+Si_{EFF}) < 0.19$ is satisfied by the mixtures.

In an embodiment of the invention, the hydraulic binder is Portland cement that has a Blaine specific surface (BSS) greater than 4,000 cm$^2$/g.

In a preferred embodiment of the invention, the hydraulic binder is Portland cement that has a $SO_3$ content lower than 6% by weight.

In an embodiment of the invention, the cementitious binder provides a cementitious settable composition when added with water, having a 24 hour compressive strength at 180 F (83° C.), as hardened, of at least 1500 psi (10.3 MPa).

In an embodiment of the invention, the cementitious binder provides a cementitious settable composition when added with water, wherein for a density from 14 pounds per gallon (ppg) (1677.6 kg/m$^3$) to 11 pounds per gallon (ppg) (1318 kg/m$^3$). Such a density can be obtained without a lightweight additive or using a reduced amount of lightweight additive. The cementitious settable composition exhibits a 24 hour compressive strength at 180 F (83° C.), as hardened, of at least 1500 psi (10.3 MPa).

Another aspect of the invention is directed to a cementitious settable composition that includes water; and a manufactured cementitious binder as recited above, wherein the cementitious settable composition has a density lower than 14 ppg (1677.6 kg/m$^3$). In particular, the cementitious settable composition has a density from 11 ppg (1318 kg/m$^3$) to 14 ppg (1677.6 kg/m3). Advantageously, the cementitious settable composition is free of a lightweight additive.

In an embodiment of the invention, for a density of 12 pounds per gallon (1437.9 kg/m$^3$) obtained without a lightweight additive, the cementitious settable composition exhibits a 24 hour compressive strength at 180 F (83° C.), as hardened, of at least 1500 psi (10.3 MPa).

Another aspect of the invention is directed to a method of cementing that includes providing a cementitious settable composition as recited above; and introducing the cementitious settable composition into an underground formation.

In an embodiment of the invention, the underground formation is a well bore.

Figure 6A:
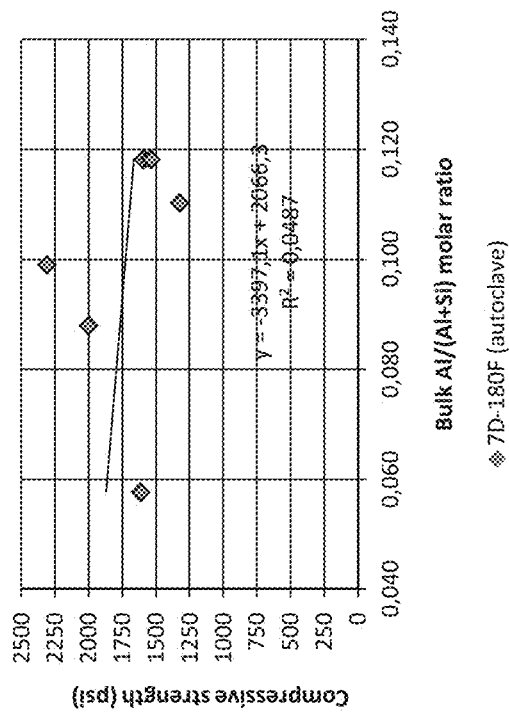
Figure 6B:
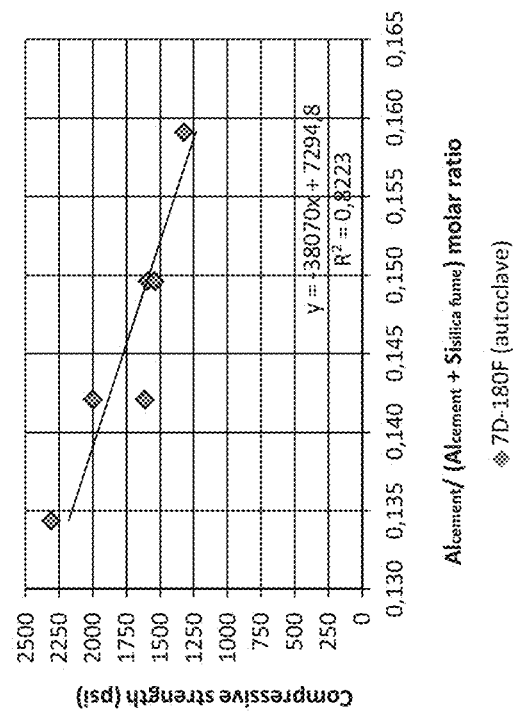
Figure 7:
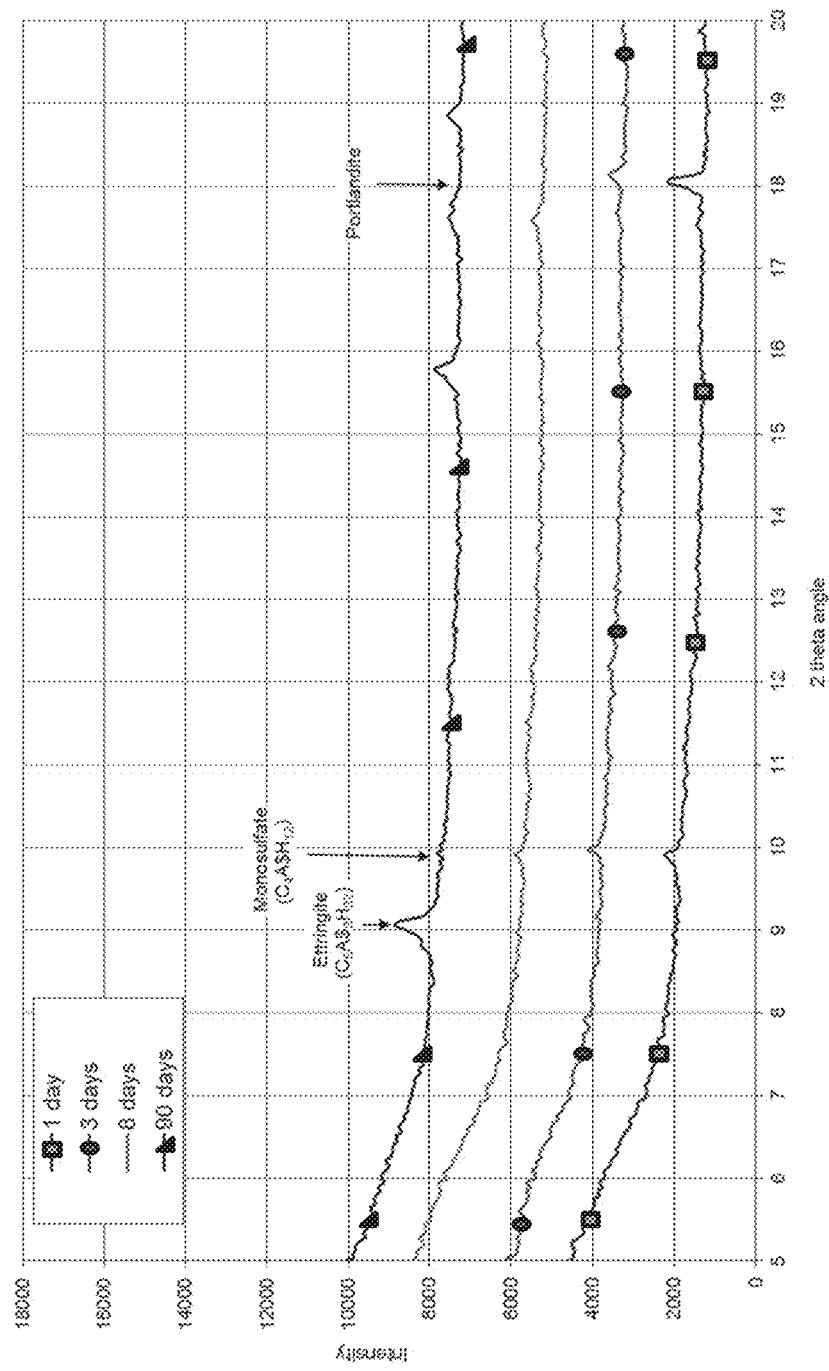
Figure 8B:
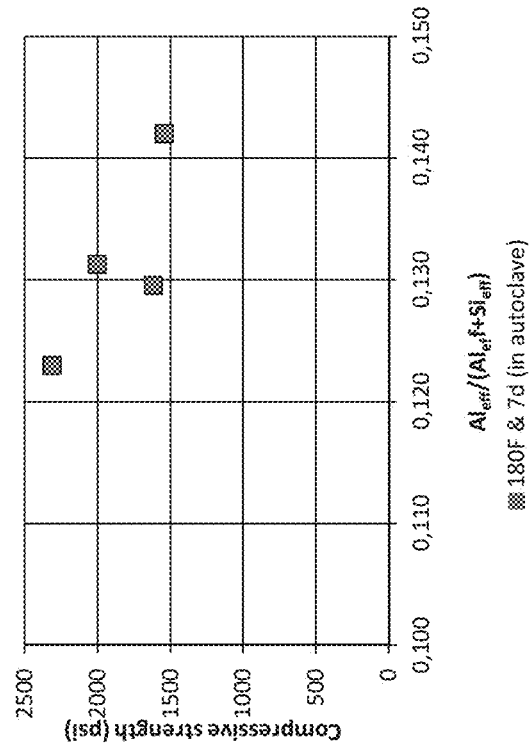
Figure 8A:
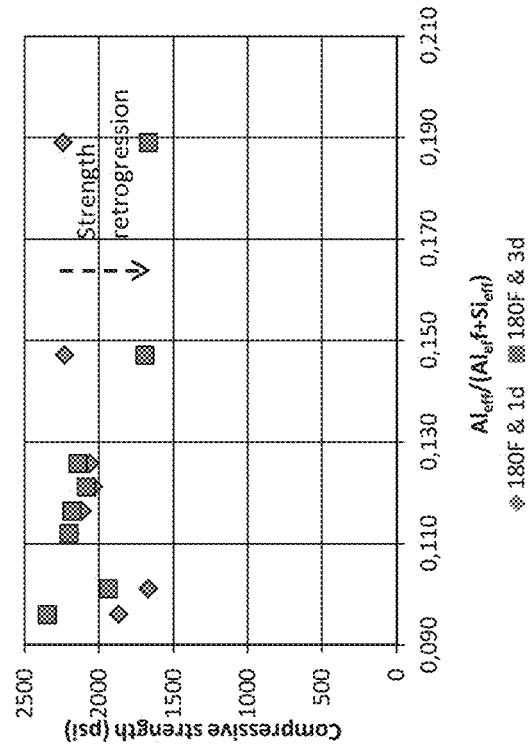
Figure 9A:
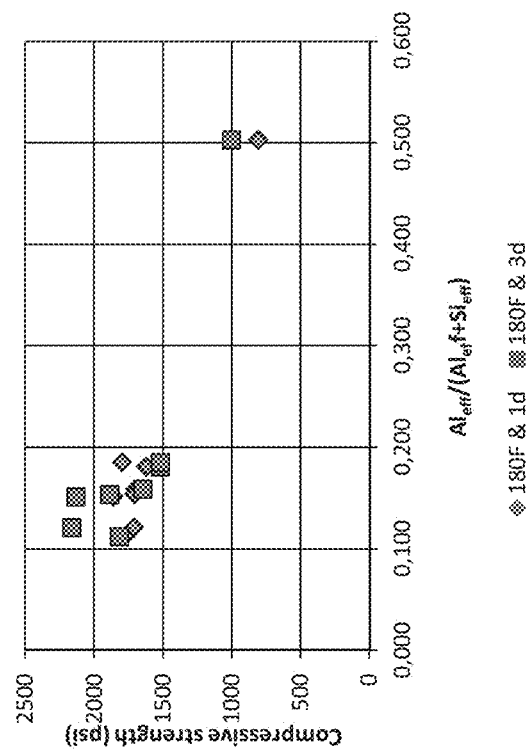
Figure 9B:
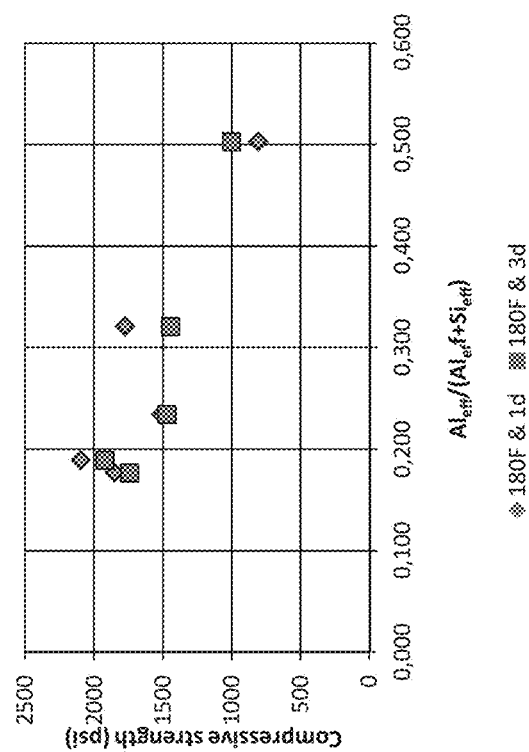

FIGS. 6A-B show the variations of the compressive strength as a function of the bulk Al/(Al+Si) molar ratio (FIG. 6A) and a modified $Al_{CEMENT}/(Al_{CEMENT}+Si_{SILICA\ FUME})$ molar ratio (FIG. 6B) for various cementitious binders;

FIG. 7 shows the variations of an X-ray diffraction pattern as a function of time of the sample prepared with the low density composition according to an embodiment of the invention;

FIGS. 8A and 8B show the variations of the compressive strength as a function of the $Al_{EFF}/(Al_{EFF}+Si_{EFF})$ molar ratio for various slurries cured at high temperature (180 F (83° C.)) and prepared with sea water, and FIGS. 9A and 9B show the variations of the compressive strength as a function of the $Al_{EFF}/(Al_{EFF}+Si_{EFF})$ molar ratio for various slurries cured at high temperature (180 F (83° C.)) and prepared with fresh water.

Various aspects of the present invention relate to a manufactured cementitious binder, a method of manufacturing the cementitious binder, a cementitious settable composition (cement slurry) and a method of cementing. In accordance with an embodiment of the invention, the cementitious binder and/or cementitious settable composition may be used in a variety of applications including, for example, subterranean applications, surface applications and construction applications. Subterranean applications may include, for example, primary cementing, remedial cementing, and drilling operations. In primary cementing, for example, pipe strings such as casings and liners are cemented in well bores. Well bores may include oil well bores, gas well bores, water well bores, geothermal well bores, and the like. In performing primary cementing, a cement slurry are pumped into the space between the walls of a well bore and the exterior surface of the pipe string disposed therein. The cement slurry is permitted to set in the space, thereby forming an annular sheath of hardened, substantially impermeable cement therein that substantially supports and positions the pipe string in the well bore and bonds the exterior surface of the pipe string to the walls of the well bore. Cement slurries are also used in plugging and abandonment operations as well as in remedial cementing operations such as plugging permeable zones or fractures in well bores, plugging cracks and holes in pipe strings, and the like.

In an aspect of the invention, the manufactured cementitious binder is configured to provide a cementitious settable composition that has a low density and possesses rapid high compressive strength by adjusting the amount of water added and without using, or including a reduced amount of, lightweight additives such as microspheres, foaming agents or the like. These cementitious characteristics are particularly desirable in cementing operations for subterranean applications. Indeed, when a cementitious settable composition is injected into the well bore and placed in the zone that is to be cemented, it is desirable that the composition presents relatively low viscosity and has effectively constant rheological properties. Once it is in place, an ideal cementitious composition should rapidly develop high compressive strength and maintain good zonal integrity. It is also very important that long-term compressive strengths (for example at 7 days and 30 days) remain at a high level (in an embodiment above 1500 psi (10.3 MPa)) and do not decrease over time.

As will be appreciated by one skilled in the art, there are numerous benefits provided by such a cementitious binder.

For example, there is significant cost reduction in manufacturing the cementitious binder according to an embodiment of the invention and preparing the cementitious settable compositions according to an embodiment of the invention, as it can be prepared by simply mixing the cementitious binder with water without using, or using a little amount of, lightweight additives. In addition, it is possible to adjust to changing requirements on cement slurry density at the well site by modifying the amount of water added to the cementitious binder instead of requiring the production of a new cementitious binder, thus leading to considerable cost savings.

As another example, by virtue of developing excellent short-term and long-term compressive strengths at high temperatures, for example, at temperatures higher than 140 F (60° C.), the cementitious binder in accordance with an embodiment of the invention can be used in many applications. For example, the use of the cementitious binder in accordance with an embodiment of the invention is extremely beneficial in cementing a well bore because it develops and maintains excellent compressive strengths over a wide range of temperatures and pressures, and thus, well bore depths. As a result, the number of different slurries/cementititous settable compositions that would otherwise be required to cement the well bore is significantly reduced.

The inventors have devised that such lightweight cementitious settable compositions, which possess short-term and long term high compressive strengths (for example, 24 hour and 30 day compressive strengths at 180 F, as hardened, of at least 1500 psi (10.3 MPa) in an embodiment) over a wide range of curing temperatures (e.g. between 140 F (60° C.) and 230 F (110° C.)), can be surprisingly obtained, without using, or including a reduced amount of, lightweight additives such as microspheres, foaming agents or the like, with a cementitious binder in which the $Al_{EFF}/(Al_{EFF}+Si_{EFF})$ ratio in the cementitious binder is maintained within a specific range. As explained hereinafter, $Al_{EFF}$ represents the molar content of aluminum in the hydraulic binder of the cementitious binder, and $Si_{EFF}$ represents the sum of the molar content of silica in the first siliceous based material for particles having a size lower than 3 μm and the molar content of silica in the second siliceous based material.

The formation of siliceous hydrogarnet ($C_3(Al,Fe)Si_{3-x}(OH)_{4x}$ where x<3; C:CaO, Al:$Al_2O_3$, Fe: $Fe_2O_3$ and Si: $SiO_2$) is considered detrimental to sample compressive strength as it possesses much higher density (typically between 2.6 and 3.2 g/cm$^3$ depending on its exact composition) compared to the other hydrated calcium aluminum phases such as so-called 'AFt' phases (e.g. ettringite) or 'AFm' phases (e.g., monosulfate (MS), monocarboaluminate, hemicarboaluminate) (with densities between 1.8 and 2.2 g/cm$^3$).

Figure 1:
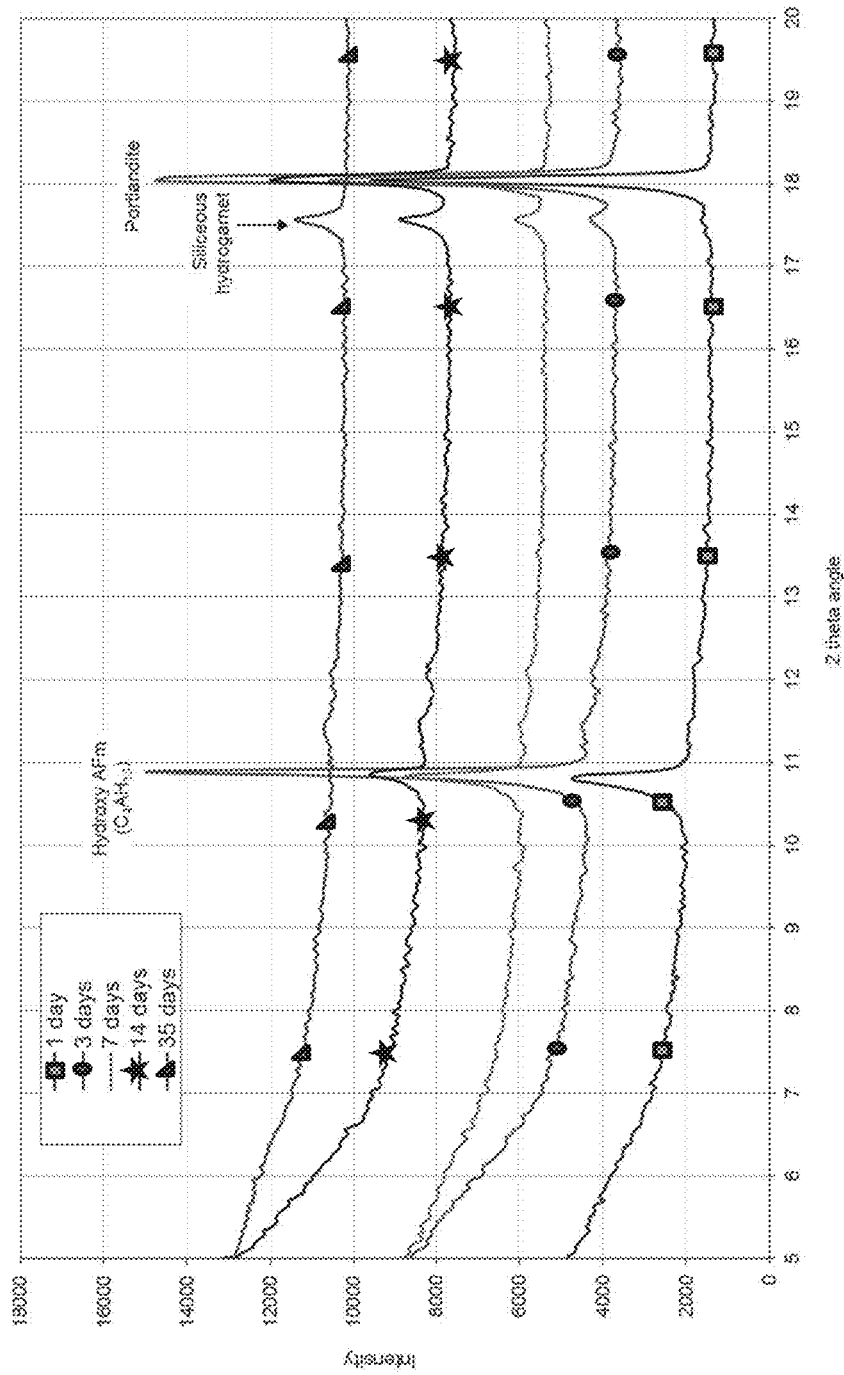
FIG. 1 shows the variations of an X-ray diffraction pattern as a function of time of a sample prepared with a low density slurry of a cementitious binder.

FIG. 1 shows the variations of an X-ray diffraction pattern as a function of time of a sample prepared with a low density cement slurry of a cementitious binder. FIG. 1 illustrates the influence of siliceous hydrogarnets formation on the compressive strength of the cured product. The composition is as follows (Table 1):

TABLE 1

| Components | Sample 1 |
|---|---|
| Microcement 650 (Blaine specific surface: 6500 cm$^2$/g) | 71 wt % |
| Limestone | 10 wt % |
| Metakaolin | 5 wt % |

TABLE 1-continued

| Components | Sample 1 |
|---|---|
| Silica source | |
| Silica fume (from silicon and ferrosilicon alloy production; Silicon SF (ES)) | 14% |
| Strength measured at 180 F. (83° C.) | |
| Slurry was prepared using deionized water and 0.45% defoamer (FP-6L) but without retarder. The sample was not conditioned, cast in cylinders and cured in a water bath) | |
| 1 day | 1135 psi |
| 7 days | 1180 psi |
| 28 days | 903 psi |
| Presence of siliceous hydrogarnet | High |

Results are provided for a slurry density of 12 ppg (1437.9 kg/m$^3$) and a curing temperature of 180 F (83° C.). The initial strength of the sample is relatively low (1135 psi (7.82 MPa) at 1 day) and decreases over time (903 psi (6.2 MPa) at 28 days). The strength loss can be correlated to the formation of the siliceous hydrogarnet containing phase at the expense of other aluminum containing phases such as $C_4AH_{13}$ (C: CaO, A: $Al_2O_3$ and H: $H_2O$). In particular, FIG. 1 shows that at 35 days, the only detectable AFt or AFm phases remaining in the cured product is the siliceous hydrogarnet containing phase.

The inventors have devised that the short-term and long-term compressive strengths of a sample prepared with a low density cementitious settable composition can be significantly improved at high curing temperatures (i.e. above 150 F (65.6° C.)) by preventing the formation of the siliceous hydrogarnet containing phase. One way to achieve this is by using a more reactive silica fume in the binder composition (Table 2).

TABLE 2

| Components | Sample 2 |
|---|---|
| Microcement 650 (Blaine specific surface: 6500 cm$^2$/g) | 71 wt % |
| Limestone | 10 wt % |
| Metakaolin | 5 wt % |
| Silica sources | |
| Silica fume (from silicon and ferrosilicon alloy production; Silicon SF (ES)) | 0 wt % |
| Silica fume (from zirconia production; Zirconia SF) | 14 wt % |
| Strength measured at 180 F. (83° C.) | |
| Slurry was prepared using deionized water and 0.45% defoamer (FP-6L) but without retarder. The sample was not conditioned, cast in cylinders and cured in a water bath) | |
| 1 day | 1370 psi |
| 7 days | 2220 psi |
| 28 days | 2130 psi |
| Presence of siliceous hydrogarnet | Low |

Figure 2:
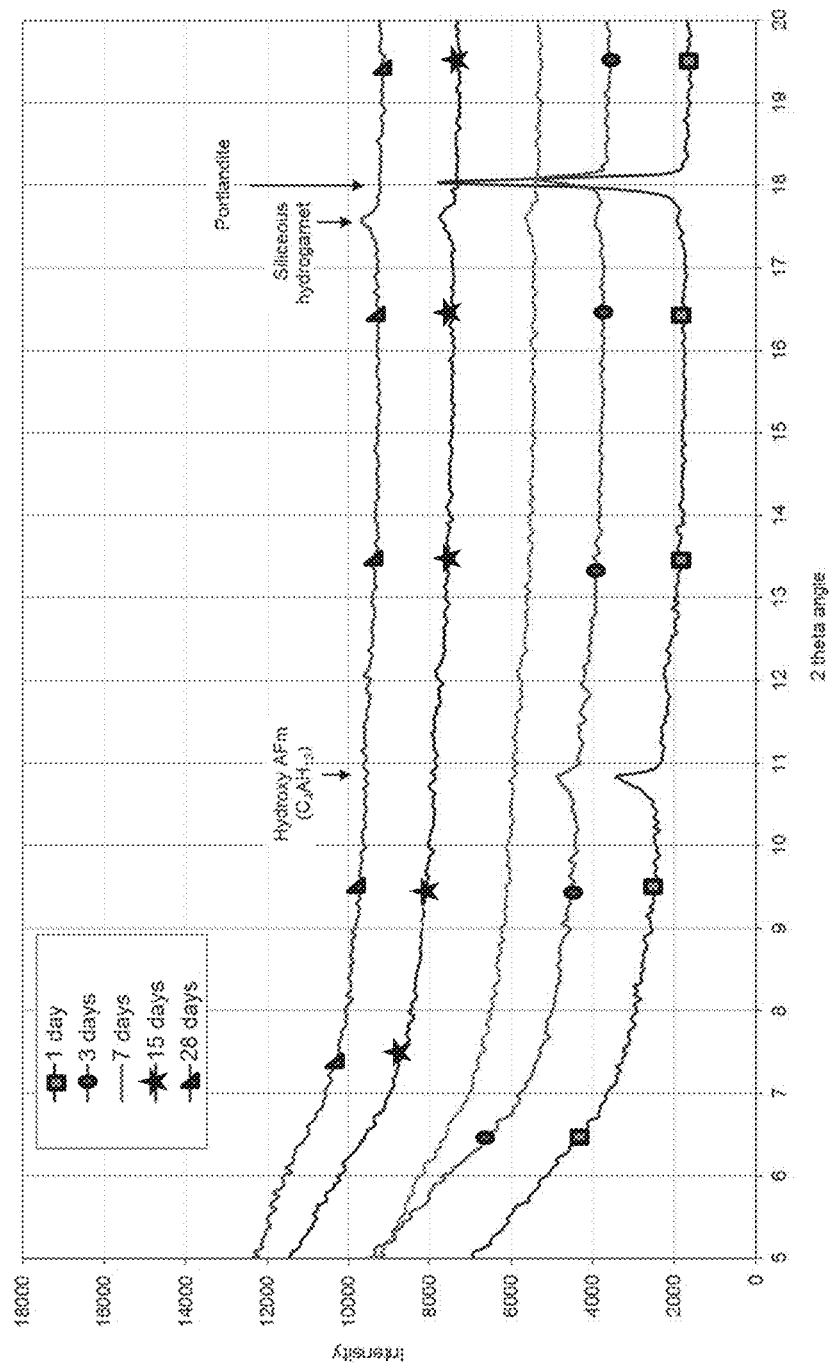
FIG. 2 shows the variations of an X-ray diffraction pattern as a function of time of a sample prepared with another low density slurry of a cementitious binder.

The composition of the cementitious binder in Table 2 differs from that of Table 1 only in that a different source of silica fume (from zirconia instead of silicon/ferrosilicon alloy production) was used to prepare the sample. As shown in FIG. 2, the use of a more reactive silica fume (from zirconia production) reduces the formation of the $C_4AH_{13}$ and siliceous hydrogarnet phases. As can be seen in Table 2, while the initial compressive strength of the sample remains relatively low (1370 psi (9.44 MPa)), unlike the sample of Table 1/FIG. 1, its compressive strength significantly increases over time.

The reduction of the undesired siliceous hydrogarnet phase can be further achieved by replacing limestone of the composition of Table 2 with silica flour. Table 3 shows the composition of a cementitious binder in accordance with an embodiment of the invention in which limestone is replaced with silica flour.

TABLE 3

| Components | Sample 3 |
|---|---|
| Microcement 650 (Blaine specific surface: 6500 cm2/g) | 71 wt % |
| Limestone | |
| Metakaolin | 5 wt % |
| Silica sources | |
| Silica fume (from silicon and ferrosilicon alloy production; Silicon SF (ES)) | 0 wt % |
| Silica fume (from zirconia production; Zirconia SF) | 14 wt % |
| Silica flour (SFL fine) | 10 wt % |
| Strength measured at 180 F. (83° C.) | |
| Slurry was prepared using deionized water and 0.45% defoamer (FP-6L) but without retarder. The sample was not conditioned, cast in cylinders and cured in a water bath) | |
| 1 day | 2367 psi |
| 7 days | 2500 psi |
| 28 days | 2542 psi |
| Presence of siliceous hydrogarnet | Low |

Figure 3:
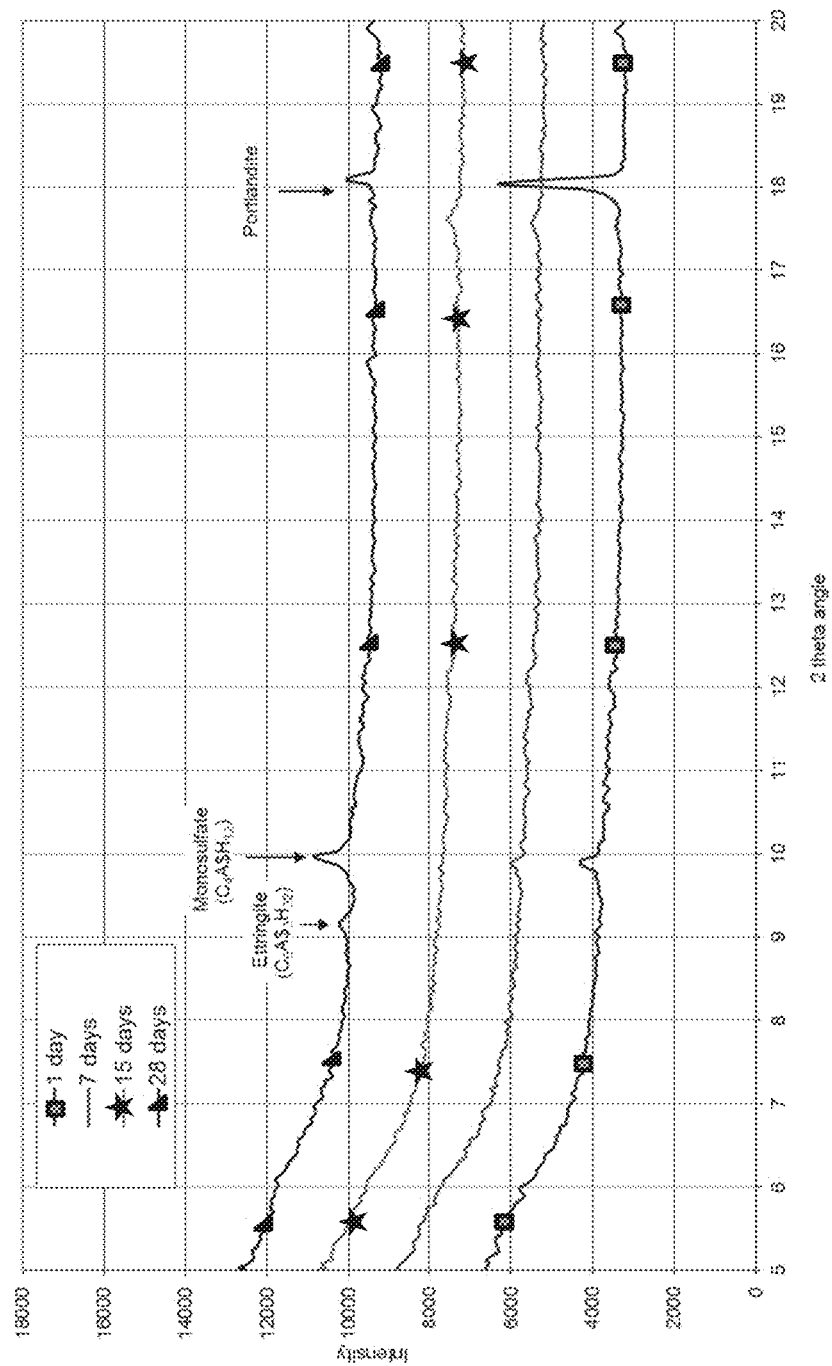
FIG. 3 shows the variations of an X-ray diffraction pattern as a function of time of the sample prepared with the low density composition according to an embodiment of the invention.

FIG. 3 shows the variations of an X-ray diffraction pattern as a function of time of the sample prepared with the cementitious binder of Table 3. As can be seen in FIG. 3, low amounts of siliceous hydrogarnet forms overtime. As a result, the short-term and long-term compressive strengths of the cured sample are very good (see Table 3).

Results of FIGS. 1-3 show that there is a direct correlation between the development of low mechanical strengths and the formation of siliceous hydrogarnets. Accordingly, it could be expected that further reduction of the bulk Al/(Al+Si) molar ratio in the cementitious binder would further improve the mechanical strength results, as it will reduce the propensity of siliceous hydrogarnet formation. Indeed, by forming less aluminum containing AFm and AFt phases, there should be less material to convert into the siliceous hydrogarnet containing phase. However, counterintuitively, it was found that the bulk Al/(Al+Si) ratio could not be used to correctly predict a sample performance. For example, Table 4 shows two cementitious compositions in which the amount of metakaolin was reduced to lower the bulk Al/(Al+Si) ratio in the cementitious binder.

TABLE 4

| Microcement 650 (Blaine specific surface: 6500 cm²/g) (wt %) | Metakaolin (wt %) | Silica fume Silicon SF (ES) (wt %) | Silica flour (SFL fine) (wt %) | Bulk Al/(Al + Si) |
|---|---|---|---|---|
| 71 | 5 | 14 | 10 | 0.126 |
| 73 | 3 | 14 | 10 | 0.109 |

Figure 4:
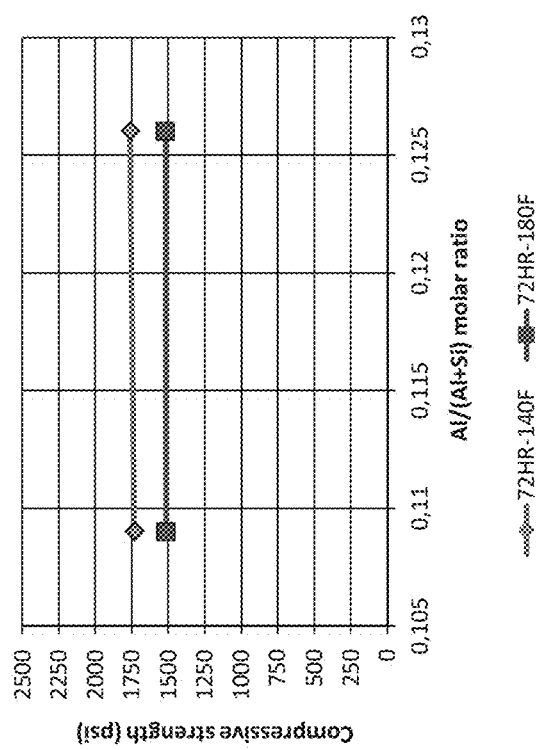
FIG. 4 shows the compressive strength after 72 hours at two different curing temperatures (140 F (60° C.) and 180 F (83° C.)) obtained with various cementitious binders.

The two compositions of Table 4 were used to prepare cementitious settable compositions having a density of 12 ppg (1437.9 kg/m3). Deionized water, 0.45% defoamer (FP-6L) and 0.5% retarder (containing sodium lignosulfonate and sodium gluconate) were used. The slurries were conditioned to 140 F (60° C.) or 180 F (83° C.) in an atmospheric consistometer and cured in a water bath. No pressure was applied during curing. FIG. 4 shows the compressive strength after 72 hours at two different curing temperatures (140 F (60° C.) and 180 F (83° C.)) obtained with the samples prepared with the two compositions of Table 4. As can be seen in FIG. 4, lowering the bulk Al/(Al+Si) molar ratio of the cementitious binder does not impact the compressive strength.

Table 5 shows three compositions of a cementitious binder in which the amount of metakaolin was reduced to lower the bulk Al/(Al+Si) ratio.

TABLE 5

| Microcement 650 (Blaine specific surface: 6500 cm²/g) (wt %) | Metakaolin (wt %) | Silica fume (Silicon SF (ES)) (wt %) | Silica flour (SFL coarse) (wt %) | Bulk Al/(Al + Si) |
|---|---|---|---|---|
| 60 | 5 | 18 | 17 | 0.099 |
| 64 | 3 | 18 | 15 | 0.088 |
| 64 | 0 | 18 | 18 | 0.058 |

Figure 5:
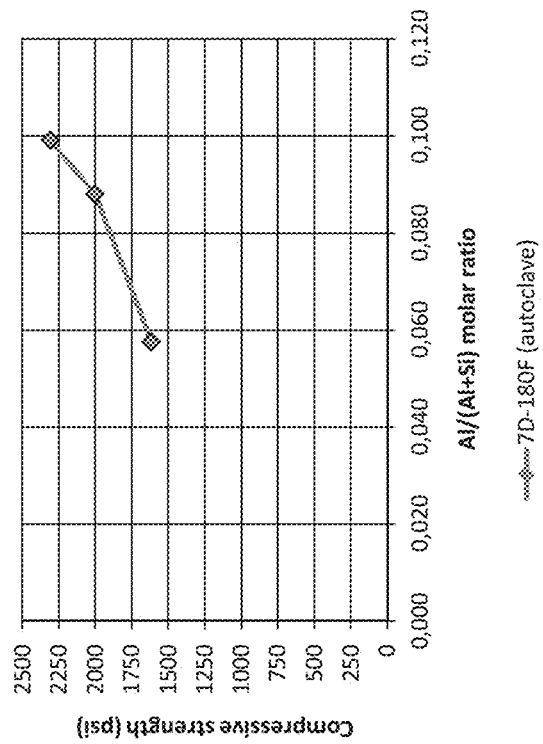
FIG. 5 shows the compressive strength after 7 days at 180 F (83° C.) obtained with various cementitious binders.

The three compositions of Table 5 were used to prepare cementitious settable compositions having a density of 12 ppg (1437.9 kg/m3). Seawater, 0.45% defoamer (FP-6L) and 0.8% retarder (containing sodium lignosulfonate and sodium gluconate) were used. The samples were conditioned at 180 F (83° C.) and cured under a pressure of 3000 psi (20.7 MPa) in an autoclave. FIG. 5 shows the compressive strength after 7 days at 180 F (83° C.) obtained with the samples prepared with the three compositions of Table 5. As can be seen in FIG. 5, unexpectedly, lowering the bulk Al/(Al+Si) ratio of the cementitious composition significantly reduces compressive strength at 7 days.

Further analysis showed that, counterintuitively, there was no correlation between the bulk Al/(Al+Si) molar ratio of the cementitious binder and the compressive strength achieved with the binder. However, unexpectedly, as shown in FIGS. 6A-B, the inventors have found that the compressive strength of a low density cementitious binder could be very well predicted by using a modified Al/(Al+Si) molar ratio that only takes into account the aluminum from the hydraulic binder (e.g. Portland cement) and the silica from the siliceous based material (e.g. silica fume). It was unexpectedly found that, in the context of a low density cementitious binder, not all sources of alumina and silica in the cementitious binder have the same effect on its compressive strength performance. Specifically, it was found that aluminum originating from the hydraulic binder (e.g. Portland cement) is mostly responsible for forming the undesired siliceous hydrogarnet phase whereas the silica from silica fume will be the most reactive material to prevent the formation of siliceous hydrogarnet.

FIGS. 6A-B show the variations of the compressive strength as a function of the bulk Al/(Al+Si) molar ratio (FIG. 6A) and the modified $Al_{CEMENT}/(Al_{CEMENT}+Si_{SILICA\ FUME})$ molar ratio (FIG. 6B) for the compositions of Table 6.

composition of Table 7 differs from that of Table 3 in that silica fume is replaced by rice husk ash.

TABLE 7

| Components | Sample 4 |
|---|---|
| Microcement 650 (Blaine specific surface: 6500 cm²/g) | 71 wt % |
| Limestone | 0 wt % |
| Metakaolin | 5 wt % |
| Silica sources | |
| Silica fume (from silicon and ferrosilicon alloy production; Silicon SF (ES)) | 0 wt % |
| Silica fume (from zirconia production; Zirconia SF) | 0 wt % |
| Rice husk ash | 14 wt % |
| Silica flour (SFL fine) | 10 wt % |
| Strength measured at 180 F. | |
| Slurry was prepared using deionized water and 0.45% defoamer (FP-6L) but without retarder. The sample was not conditioned, cast in cylinders and cured in a water bath) | |
| 1 day | 2613 psi |
| 7 days | 2636 psi |
| 28 days | — |
| Presence of siliceous hydrogarnet | Low |

FIG. 7 shows the variations of an X-ray diffraction pattern as a function of time of the sample prepared with the cementitious binder of Table 7. As can be seen in FIG. 7, no siliceous hydrogarnet containing phase form over time. As a result, the short-term and long-term compressive strengths of the cured sample are very good (see Table 7).

It is proposed in an aspect of the invention to prepare a low density cementitious binder for use at densities equal to or lower than 14 ppg (1677.6 kg/m3) and in a wide temperature range, for example below 230 F (110° C.), which provides a cured product that is substantially devoid of a siliceous hydrogarnet containing phase. Short-term and long-term compressive strengths are achieved with a cementitious binder that includes a hydraulic binder, a first sili-

TABLE 6

| Microcement 650 (Blaine specific surface: 6500 cm²/g) (wt %) | Metakaolin (wt %) | Silica fume (Silicon SF (ES)) (wt %) | Silica flour (SFL coarse) (wt %) | Bulk Al/ (Al + Si) molar ratio | $Al_{CEMENT}/(Al_{CEMENT}+Si_{SILICA\ FUME})$ molar ratio |
|---|---|---|---|---|---|
| 68 | 5 | 18 | 9 | 0.118 | 0.150 |
| 65 | 5 | 16 | 14 | 0.110 | 0.159 |
| 68 | 5 | 18 | 9 | 0.118 | 0.150 |
| 60 | 5 | 18 | 17 | 0.099 | 0.134 |
| 64 | 3 | 18 | 15 | 0.088 | 0.142 |
| 64 | 0 | 18 | 18 | 0.058 | 0.142 |

In Table 6, the samples were produced using seawater, 0.45% defoamer (FP-6L) and 0.8% retarder (containing sodium lignosulfonate and sodium gluconate) and cured at 180 F (83° C.) under a pressure of 3000 psi in an autoclave. Results are provided after 7 days. $Al_{CEMENT}$ corresponds to the molar content of aluminum in the hydraulic binder (cement) and $Si_{SILICA\ FUME}$ corresponds to the molar content of silica in silica fume. As can be seen in FIGS. 6A-B, unexpectedly, the selection of the modified $Al_{CEMENT}/(Al_{CEMENT}\ Si_{SILICA\ FUME})$ molar ratio for the compositions of Table 6 is better correlated to the strength performance of the cured sample compared to the bulk Al/(Al+Si) ratio.

It will be appreciated that alternative materials in lieu of silica fume could be used in the cementitious binder according to an embodiment of the invention. For example, similar results in terms of compressive strengths are obtained with a cementitious binder that includes rice husk ash. The ceous based material, a second siliceous based material and an aluminum based material, and in which the ratio $Al_{EFF}/(Al_{EFF}+Si_{EFF})$ is controlled within a specific range, where $Al_{EFF}$=molar content of aluminum in the hydraulic binder, and $Si_{EFF}$=molar content of silica in the first siliceous based material for particles having a size lower than 3 μm+molar content of silica in the second siliceous based material. In the above ratio, only particles of the first siliceous based material that have a size lower than 3 μm are taken into account in the calculation. Accordingly, if all particles of the first siliceous based material have a size equal to or greater than 3 μm, $Si_{EFF}$ will correspond to only the molar content of silica in the second siliceous based material.

For example, in an embodiment of the invention, the manufactured cementitious binder includes a hydraulic binder in an amount in the range from 50 to 80% by weight of the cementitious binder, a first siliceous based material in an amount in the range from 0.5 to 35% by weight of the cementitious binder and having a ($SiO_2$)/($Al_2O_3$) ratio by weight greater than 2.5; a second siliceous based material in an amount in the range from 10 to 25% by weight of the cementitious binder, the second siliceous based material being different from the first siliceous based material and having (a) a ($SiO_2$)/($Al_2O_3$) ratio by weight greater than 10 and (b) a BET specific surface area greater than 5 $m^2/g$; and an aluminum based material in the range from 0 to 10% by weight of the cementitious binder and having a ($SiO_2$)/($Al_2O_3$) ratio by weight lower than 2.5, wherein $0.09<Al_{EFF}/(Al_{EFF}+Si_{EFF})<0.28$, where $Al_{EFF}$=molar content of aluminum in the hydraulic binder, and $Si_{EFF}$=molar content of silica in the first siliceous based material for particles having a size lower than 3 µm+molar content of silica in the second siliceous based material.

In particular, in an embodiment, the cementitious binder includes a hydraulic binder in an amount in the range of from 55% to 78%, preferably from 58% to 75%, by weight of the cementitious binder; a first siliceous based material in an amount in the range of from 5% to 30%, preferably from 8% to 30%, preferably from 10% to 25% by weight of the cementitious binder; a second siliceous based material in an amount in the range of from 10% to 20%, preferably from 15% to 19% by weight of the cementitious binder; and an aluminum based material in the range from 0% to 7%, preferably from 2% to 6% by weight of the cementitious binder. The ratio $Al_{EFF}/(Al_{EFF}+Si_{EFF})$ may be from 0.09 to 0.21 for a cement slurry prepared with fresh water and from 0.11 to 0.16 for a cement slurry prepared with sea water, where $Al_{EFF}$=molar content of aluminum in the hydraulic binder, and $Si_{EFF}$=molar content of silica in the first siliceous based material for particles having a size lower than 3 µm+molar content of silica in the second siliceous based material. For example, in an embodiment, the ratio $Al_{EFF}/(Al_{EFF}+Si_{EFF})$ may be from 0.09 to 0.19, preferably from 0.09 to 0.17, more preferably from 0.09 to 0.15 for a cement slurry prepared with fresh water. In an embodiment, the ratio $Al_{EFF}/(Al_{EFF}+Si_{EFF})$ may be from 0.09 to 0.16, preferably from 0.09 to 0.15, more preferably from 0.09 to 0.14 for a cement slurry prepared with seawater. Moreover, in an embodiment, the ($SiO_2$)/($Al_2O_3$) ratio by weight of the first siliceous based material can be from 2.5 to 10, in an embodiment greater than 5, for example greater than 10, and even greater than 100 and, in an embodiment, up to 800. In an embodiment, the ($SiO_2$)/($Al_2O_3$) ratio by weight of the second siliceous based material can be greater than 20, preferably greater than 100, even more preferably greater than 200 and, in an embodiment, up to 2000. In an embodiment, the ($SiO_2$)/($Al_2O_3$) ratio by weight of the aluminum based material can be lower than 2, preferably lower than 1.5, even more preferably greater than I.

In an embodiment, the cementitious binder consists essentially of, or even consists of, a hydraulic binder in an amount in the range from 50 to 80% by weight of the cementitious binder, a first siliceous based material in an amount in the range from 0.5 to 35% by weight of the cementitious binder and having a ($SiO_2$)/($Al_2O_3$) ratio by weight greater than 2.5; a second siliceous based material in an amount in the range from 10 to 25% by weight of the cementitious binder, the second siliceous based material being different from the first siliceous based material and having (a) a ($SiO_2$)/($Al_2O_3$) ratio by weight greater than 10 and (b) a BET specific surface area greater than 5 $m^2/g$; and an aluminum based material in the range from 0 to 10% by weight of the cementitious binder and having a ($SiO_2$)/($Al_2O_3$) ratio by weight lower than 2.5, wherein $0.09<Al_{EFF}/(Al_{EFF}+Si_{EFF})<0.28$, where $Al_{EFF}$=molar content of aluminum in the hydraulic binder, and $Si_{EFF}$=molar content of silica in the first siliceous based material for particles having a size lower than 3 µm+molar content of silica in the second siliceous based material, and optional additives other than lightweight additives.

In an embodiment of the invention, the sum by weight percent of the hydraulic binder, the first siliceous based material, the second siliceous based material, the aluminum based material and additives other than lightweight additives is 80, advantageously 85, more advantageously 90, more advantageously 95, more advantageously 100, In an embodiment of the invention, $0.09<Al_{EFF}/(Al_{EFF}+Si_{EFF})<0.26$. In a preferred embodiment of the invention, $0.09<Al_{EFF}/(Al_{EFF}+Si_{EFF})<0.19$.

The term "cementitious binder" is to be understood as the mixture, in dry form, of at least the hydraulic binder, the first siliceous based material, the second siliceous based material and the optional aluminum based material. The cementitious binder excludes aggregates. In an embodiment, the cementitious binder is provided as a pre-mix that is mixed with water to achieve a desired density (typically lower than 14 ppg (1677.6 kg/m3), for example 12 ppg (1437.9 kg/m3)) to form a cementitious settable composition (also referred to as a "slurry"). In an embodiment, the premix is free of lightweight additives and the slurries at densities as low as 12 ppg (1437.9 kg/m3) are prepared without lightweight additives.

The term "hydraulic binder" is to be understood as a material which sets and hardens by hydration, for example a cement.

In an embodiment, the hydraulic binder is Portland cement chosen from the standard CPA-type (Artificial Portland Cement) Portland cements, and in particular from the cements described in European Standard EN 197-1. In an embodiment, the hydraulic binder can be selected from Class A, B, C, G, H cements according to the American Petroleum Institute (API). Portland clinker is obtained by clinkering at high temperature a mixture comprising limestone and, for example, clay. The Portland cement is a cement of type CEM I, CEM II, CEM III, CEM IV or CEM V according to the NF EN 197-1 Standard. It is possible to use for example a CEM1 or CEM2 52.5 N or R or PM (for marine construction) cement or PMES (for marine construction, sulfated water). The cement can be of the HRI type (High Initial Strength). In some instances, notably for type CEM2, the Portland cement is not made of pure clinker but is provided admixed with at least one additional material (slag, silica fume, pozzolana, fly ash, calcinated schist, lime etc.) in an amount of up to 37%. In these instances, it will be appreciated that the content of pozzolans, slag and fly ash of the blended cements are counted towards the respective content of the first siliceous, second siliceous or aluminum based material of the cementitious binder, rather than in the content of the hydraulic binder.

In an embodiment of the invention, the hydraulic binder is Portland cement that has a Blaine specific surface (BSS) greater than 4,000 $cm^2/g$.

In a preferred embodiment of the invention, the hydraulic binder is Portland cement that has a $SO_3$ content lower than 6% by weight.

The Blaine specific surface is determined in accordance with the EN 196-6 standard of August 1990, paragraph 4. The Blaine specific surface of a particulate material is determined by using a measuring apparatus which comprises: a cylindrical measuring cell with an internal diameter of 12.7 mm±0.1 mm; a close-fitting perforated metal disk at the bottom of the cell; a piston which slides in the measuring cell and which is stopped at a distance of 15 mm±1 mm from the top surface of the perforated disk to the base of the piston when the piston is depressed; the piston allows the passage of air; a manometer which comprises a U-shaped glass tube, one branch of which is attached to the bottom of the measuring cell, the same branch comprising an engraved line with a further three engraved lines generally spaced 15, 70 and 110 mm above it and a T-junction to a side tube which is connected above the topmost engraved line on the tube via a valve to a suction means (such as a rubber tube and a suction bulb).

The inner surface of the manometer is wetted with a manometric liquid (for example dibutyl phthalate). The manometer is then filled with the manometric liquid up to the lowest engraved line.

A filter paper disk is placed on the perforated disk in the measuring cell; the sample is placed in the cell; a second filter paper disk is placed on top of the sample which is then compacted using the piston.

The porosity of the bed of material (e) in the measuring cell is derived from the mass of material (m in g), the material density (p in g/cm³), and the total volume of the bed of compacted material (V in cm³) using the formula: m=ρ× V×(1−e).

The density of the material is determined using a pycnometer.

The volume of the bed of material is determined by measuring the difference between the amount of mercury required to fill the empty cell and the amount to fill the space above the sample to be tested.

The measurement of air permeability is conducted using an amount of material sufficient to give a bed porosity e=0.500. With the top of the measuring cell capped the level of the manometric liquid is adjusted to the highest engraved line using the suction means and valve. The cap is then removed to allow air to permeate through the bed of test material. As air flows through the bed the level of the manometric liquid falls. The time (t) for the liquid to fall from the third engraved line to the second is measured. The procedure is carried out at 20° C.±2° C. and a relative humidity of ≤65%. The temperature for each measurement is measured and an average value taken.

The procedure is carried out on a second sample of material, twice for each sample. The procedure is also carried out on three samples of a reference material of known Blaine specific surface.

The Blaine specific surface (S) of the material is calculated using the formula:

$$S = \frac{S_0 \rho_o (0,9 - e_o) \sqrt{\eta_o} \sqrt{e^3} \sqrt{t}}{\rho (0,9 - e) \sqrt{e_o^3} \sqrt{t_o} \sqrt{\eta}}$$

$S_o$=surface mass of the reference material (cm²/g),
e=porosity of the material tested,
$e_o$=porosity of the reference material
t=average time measured for the tested material (s)
$t_o$=average of the three times measured for the reference material (s)
ρ=density of the test material (g/cm³),
$\rho_o$=density of the reference material (g/cm³),
η=viscosity of air at the test temperature for the tested material (Pa)
$\eta_o$=viscosity of air at the test temperature for the reference material (Pa).

In an embodiment of the invention, the first siliceous based material is selected from the group consisting of slag, siliceous pozzolan, silica flour and mixtures thereof.

Slag can include the glass-like by-product of ferrous and non-ferrous smelting processes, and is usually a mixture of metal oxides and silicon dioxide with a small content of metal sulfides and elemental metals. For cement use, the molten slag is rapidly cooled by large quantities of water to produce a sand-like granule that is then ground to a higher fineness.

A siliceous pozzolan advantageously has a $SiO_2/Al_2O_3$ weight ratio higher than 2.5. A siliceous pozzolan can include materials of volcanic origin such as basalts, pumice, tuff and zeolites. These materials in themselves possess little or no cementitious value but which will, in finely divided form and in the presence of water, react chemically with calcium hydroxide at ordinary temperature to form compounds possessing cementitious properties. The broad definition of a pozzolan imparts no bearing on the origin of the material, only on its capability of reacting with calcium hydroxide and water.

Silica flour, also known by the name of microsand, is a product obtained by grinding silica sand.

Moreover, in an embodiment of the invention the second siliceous based material is selected from the group consisting of silica fume, precipitated silica, rice husk ash, and mixtures thereof.

Silica fume, also known by the name of micro silica, is a by-product formed in the production of silicon or ferro-silicon alloys or zirconia and is collected by filtration of gases leaving the electric arc furnace. Typically it contains at least 75%, by weight, of silicon dioxide and consists of very fine spherical particles less than about 0.1 μm.

Precipitated silica is a silica produced by precipitation from a solution containing silicate salts by using mineral acids. The resulting white precipitate is filtered, washed and dried. The final particles are porous consisting of agglomerated primary particles with a diameter of 5-100 nm.

Rice husk ash is a by-product of rice milling. The husk which surrounds the rice grain is burned to produce energy and converted to an ash which contains at least 85% amorphous silica.

In yet another embodiment of the invention, the aluminum based material is selected from the group consisting of metakaolin, calcined clay, fly ash, aluminum based natural pozzolan and mixtures thereof.

Metakaolin is a dehydroxylated form of the clay mineral kaolinite. It is a finely-divided material which in the presence of water reacts chemically with calcium hydroxide at ordinary temperature to form compounds possessing cementitious properties.

Calcined clay can include the dehydroxylated product of clay minerals such as illite and montmorillonite. They are finely-divided materials which in the presence of water react chemically with calcium hydroxide at ordinary temperature to form compounds possessing cementitious properties Fly ash is a material obtained by electrostatic or mechanical precipitation of pulverulent particles contained in the smoke of boilers fed with pulverized coal (refer to the EN 197-1 Standard, paragraph 5.2.4).

An aluminium based pozzolan advantageously has a $SiO_2/Al_2O_3$ weight ratio below 2.5. Aluminum based natural pozzolan can include materials of volcanic origin such as basalts, pumice, tuff and zeolites. These materials in themselves possess little or no cementitious value but which will, in finely divided form and in the presence of water, react chemically with calcium hydroxide at ordinary temperature to form compounds possessing cementitious properties. The broad definition of a pozzolan imparts no bearing on the origin of the material, only on its capability of reacting with calcium hydroxide and water It will be appreciated that any mixtures of the above first siliceous based materials, second siliceous based materials, aluminum based materials can be used to prepare the cementitious binder to the extent the relationship $0.09<Al_{EFF}/(Al_{EFF}+Si_{EFF})<0.28$ is satisfied by the mixtures.

The specific BET surface area is a measurement of the total real surface area of the particles which takes into account the presence of reliefs, irregularities, surface or internal cavities, and porosity. BET surface area may be measured using conventional methods, for example based on the adsorption of nitrogen by the sample at a given temperature.

For example, the BET specific surface of powders is measured as follows. A sample of powder of the following mass is taken: 0.1 to 0.2 g for an estimated specific surface of more than 30 m$^2$/g; 0.3 g for an estimated specific surface area of 10-30 m$^2$/g; 1 g for an estimated specific surface area of 3-10 m$^2$/g; 1.5 g for an estimated specific surface area of 2-3 m$^2$/g; 2 g for an estimated specific surface area of 1.5-2 m$^2$/g; 3 g for an estimated specific surface area of 1-1.5 m$^2$/g.

A cell of 3 cm$^3$ or 9 cm$^3$ is used depending on the volume of the sample. The measurement cell assembly is weighed (cell+glass rod). Then the sample is added to the cell: the product must not be less than one millimeter from the top of the throat of the cell. The assembly is weighed (cell+glass rod+sample). The measurement cell is placed in a degassing unit and the sample is degassed. Degassing parameters are 30 min/45° C. for Portland cement, gypsum, pozzolans; 3 h/200° C. for slags, silica fume, fly ash, alumina cement, limestone; and 4 h/300° C. for a control sample of alumina. The cell is rapidly closed with a stopper after degassing. The assembly is weighed and the result recorded. All weighing is carried out without the stopper. The mass of the sample is obtained by subtracting the mass of the cell from the mass of the cell+degassed sample.

Analysis of the sample is then carried out after placing it in the measurement unit. The analyzer is a Beckman Coulter SA 3100. Measurement is based on the adsorption of nitrogen by the sample at a given temperature, in this case the temperature of liquid nitrogen i.e. −196° C. The device measures the pressure of the reference cell in which the adsorbate is at its saturation vapor pressure and that of the sample cell in which known volumes of adsorbate are injected. The resulting curve of these measurements is the adsorption isotherm. In the measurement method, it is necessary to know the dead space volume of the cell: measurement of this volume is therefore carried out with helium before the analysis.

The sample mass previously calculated is entered as a parameter. The BET specific surface is determined by the software by linear regression from the experimental curve. The reproducibility standard deviation obtained from 10 measurements on a silica of specific surface 21.4 m$^2$/g is 0.07. The reproducibility standard deviation obtained from 10 measurements on a cement of specific surface area 0.9 m$^2$/g is 0.02. A control is carried out once every two weeks on a reference product. Twice yearly, a control is carried out with the control alumina supplied by the manufacturer.

The cementitious settable composition or cementitious binder may also comprise a superplasticizer. The term "superplasticizer" as used in this specification is to be understood as including both water reducers and superplasticizers as described in the Concrete Admixtures Handbook, Properties Science and Technology, V.S. Ramachandran, Noyes Publications, 1984.

A water reducer is defined as an additive which reduces the amount of mixing water of concrete for a given workability by typically 10-15%. Water reducers include, for example lignosulphonates, hydroxycarboxylic acids, carbohydrates, and other specialized organic compounds, for example glycerol, polyvinyl alcohol, sodium aluminomethyl-siliconate, sulfanilic acid and casein.

Superplasticizers belong to a new class of water reducers chemically different from the normal water reducers and capable of reducing water contents by about 30%. The superplasticizers have been broadly classified into four groups: sulphonated naphthalene formaldehyde condensate (SNF) (generally a sodium salt); or sulphonated melamine formaldehyde condensate (SMF); modified lignosulfonates (MLS); and others. More recent superplasticizers include polycarboxylic compounds such as polyacrylates. The superplasticizer can be a new generation superplasticizer, for example a copolymer containing polyethylene glycol as graft chain and carboxylic functions in the main chain such as a polycarboxylic ether. Phosphonic acid derivatives may also be used. Sodium polycarboxylate-polysulphonates and sodium polyacrylates may also be used.

Other additives may be included in the cementitious binder or the cementitious settable composition according to the invention, for example, a defoaming agent (e.g. polydimethylsiloxane). These also include silicones in the form of a solution, a solid or preferably in the form of a resin, an oil or an emulsion, preferably in water.

The cementitious binder or cementitious settable composition may also include a cementitious accelerator to accelerate hydration. A cementitious accelerator is defined herein as any admixture(s) that is/are added to the binder and is/are adapted to accelerate hydration of the cementitious composition in a controlled manner. As will be appreciated by one skilled in the art, controlling hydration of the cementitious binder may be desirable in various circumstances to obtain the intended mechanical and rheological properties. Thus, according to various embodiments of the invention, the cementitious accelerator may be selected and added to the cementitious binder in a controlled amount to accelerate hydration. The cementitious accelerator defined herein and encompassed by various embodiments of the invention departs from chemical(s) and/or component(s) present in other products (e.g. by-products), which chemical(s) and/or component(s) may exhibit accelerating properties in some circumstances but are not provided in a controlled amount to the composition.

The cementitious accelerator can be separately added during or after co-grinding and/or blending the various ingredients of the cementitious binder. For example, the cementitious accelerator can be added at the time of preparing the slurry. Thus, the cementitious accelerator can be added to the mixture including the hydraulic binder, the first siliceous based material, the second siliceous based material and the optional aluminum based material at the time of preparing the slurry.

Examples of suitable cementitious accelerators are, but not limited to, a source of chlorides in which chlorides are provided in a controlled amount, triethanolamine, sodium thiocyanate, calcium formate, calcium nitrite, calcium nitrate, alkali salts, non-chloride based accelerators such as Grace Construction Products Polarset® or any combination thereof. This is not limiting. Additional cementitious accelerators may be used in other embodiments of the invention.

Optionally, other additional additives may be added to the cementitious settable compositions of the present invention as deemed appropriate by one skilled in the art, with the benefit of this disclosure. Examples of such additives include, but are not limited to, retarders, fluid loss, extenders, weighting agents, lost circulation prevention agents, etc, combinations thereof and the like. In an embodiment of the invention, the cementitious binder provides a cementitious settable composition, when added with water, that has a density lower than 14 pounds per gallon (ppg) (1677.6 kg/m$^3$) and a 24 hour and 7 day compressive strength, as hardened, of at least 1500 psi (10.3 MPa) and for a temperature range below 230 F (110° C.), for example, between 130 F (54.4° C.) and 230 F (110° C.). Such properties can be obtained for a composition free of lightweight additives such as microspheres, foaming agents or the like. In yet another embodiment of the invention, the cementitious binder provides a cementitious settable composition, when added with water, that has a density lower than 13 pounds per gallon (ppg) (1557.7 kg/m$^3$) and a 24 hour and 7 day compressive strength, as hardened, of at least 1500 psi (10.3 MPa), and for a temperature range below 230 F (110° C.), for example, between 130 F (54.4° C.) and 230 F (110° C.). Such properties can be obtained for a composition free of lightweight additives such as microspheres, foaming agents or the like. In another embodiment of the to invention, the cementitious binder provides a cementitious settable composition, when added with water, that has a density lower than 12 pounds per gallon (ppg) (1437.9 kg/m$^3$) and a 24 hour and 7 day compressive strength, as hardened, of at least 1500 psi (10.3 MPa) and for a temperature range below 230 F (110° C.), for example, between 130 F (54.4° C.) and 230 F (110° C.). Such properties can be obtained for a composition using a reduced amount of lightweight additives such as microspheres, foaming agents or the like. In yet another embodiment of the invention, the cementitious binder provides a cementitious settable composition, when added with water, that has a density lower than 11 pounds per gallon (ppg) (1318 kg/m$^3$) and a 24 hour and 7 day compressive strength, as hardened, of at least 1500 psi (10.3 MPa) and for a temperature range below 230 F (110° C.), for example, between 130 F (54.4° C.) and 230 F (110° C.). Such properties can be obtained for a composition using a reduced amount of lightweight additives such as microspheres, foaming agents or the like. In yet another embodiment of the invention, the cementitious binder provides a cementitious settable composition, when added with water, that has a density lower than 10 pounds per gallon (ppg) (1198 kg/m$^3$) and a 24 hour and 7 day compressive strength, as hardened, of at least 1500 psi (10.3 MPa) and for a temperature range below 230 F (110° C.), for example, between 130 F (54.4° C.) and 230 F (110° C.). Such properties can be obtained for a composition using a reduced amount of lightweight additives such as microspheres, foaming agents or the like. In yet another embodiment of the invention, the cementitious binder provides a cementitious settable composition, when added with water, that has a density lower than 9 pounds per gallon (ppg) and a 24 hour and 7 day compressive strength, as hardened, of at least 1500 psi (10.3 MPa) and for a temperature range below 230 F (110° C.), for example, between 130 F (54.4° C.) and 230 F (110° C.). Such properties can be obtained for a composition using a reduced amount of lightweight additives such as microspheres, foaming agents or the like. In yet another embodiment of the invention, the cementitious binder provides a cementitious settable composition, when added with water, that has a density lower than 8 pounds per gallon (ppg) (1198 kg/m$^3$) and a 24 hour and 7 day compressive strength, as hardened, of at least 1500 psi (10.3 MPa and for a temperature range below 230 F (110° C.), for example, between 130 F (54.4° C.) and 230 F (110° C.). Such properties can be obtained for a composition using a reduced amount of lightweight additives such as microspheres, foaming agents or the like.

It will be appreciated that a reduced amount of lightweight additives (e.g. microspheres) is a quantity less than what would have been necessary to obtain the same strength performances when using conventional low density cementitious compositions.

Advantageously, the composition will contain less than 50% by weight, compared to the weight of cementitious binder, of lightweight additives, more advantageously less than 45% by weight, more advantageously less than 40% by weight, more advantageously less than 35% by weight, more advantageously less than 30% by weight, more advantageously less than 25% by weight, more advantageously less than 20% by weight, more advantageously less than 15% by weight, more advantageously less than 10% by weight, more advantageously less than 5% by weight, more advantageously less than 2% by weight, The water used in the cementitious settable compositions of embodiments of the present invention may include freshwater, saltwater (e.g., water containing one or more salts dissolved therein), brine (e.g., saturated saltwater produced from subterranean formations), seawater, or combinations thereof. One of the significant benefits of the cementitous binder according to an embodiment of the invention is that its short-term and long-term compressive strengths are maintained at high temperatures (e.g. between 130 and 230 F (110° C.)) regardless of the type of water that is used to prepare the settable cementitious composition. Accordingly, it will be appreciated that the water may be from any source, provided that it does not contain an excess of compounds that may adversely affect other components in the cementitious settable composition. In some embodiments, the water may be included in an amount sufficient to form a pumpable slurry. In some embodiments, the water may be included in the cementitious settable compositions of embodiments of the present invention in an amount in the range of from about 55% to about 200% by weight. As used herein, the term "by weight," when used herein to refer to the percent of a component in the cementitious settable composition, means by weight included in the cementitious settable compositions of the present invention relative to the weight of the dry components in the cementitious settable composition. In some embodiments, the water may be included in an amount in the range of from about 55% to about 140% by weight.

While the present cementitious binder according to an embodiment of the invention is formulated to prepare cementitious settable compositions at densities below 14 ppg (1677.6 kg/m3), for example at 12 ppg (1437.9 kg/m3), without using lightweight additives, and that exhibit high strength performances, it is envisioned that cementitious settable compositions having a density lower than about 11 ppg (1318 kg/m3) can be obtained by using a reduced amount of lightweight additives, such as microspheres. It will be appreciated that the amount of lightweight additives (e.g. microspheres) to prepare cementitious settable compositions at those low densities (i.e. less than 11 ppg (1318 kg/m3), e.g. less than 10 ppg (1198 kg/m3)) is less than what would have been necessary to obtain the same strength performances when using conventional low density cementitious compositions. A formulation of ultralight cementitious settable composition (e.g. 10 ppg (1198 kg/m3), 9 ppg (1078.4 kg/m3) and 8 ppg (958.6 kg/m3)) can be obtained by first determining the water content required to achieve a desired compressive strength in a cementitious settable composition without lightweight additives such as microspheres. The required amount of lightweight additives (e.g. microspheres) is then calculated to achieve the target weight of the cementitious settable composition. Up to a certain content, the lightweight additives, such as microspheres, are considered as fillers that have minimal impact on water content and rheology and therefore will maintain any designed target strength.

The term "lightweight additive" refers to an additive having a true specific density less than 2000 kg/m$^3$ or a bulk specific density less than 1200 kg/m$^3$. Lightweight additives are for example defined in norm NF EN 13055-1, December 2002. An example of lightweight additive is microspheres, ie sphere having a diameter inferior to 1000 microns. Hollow ceramic beads generally have a diameter from approximately 25 to 300 microns. Hollow glass microspheres generally have a diameter from 10 to 90 microns.

A variety of microspheres may be utilized in accordance with embodiments of the present invention, including hollow, solid, and/or porous microspheres. Suitable microspheres may include a variety of materials, including, but not limited to, microspheres that comprise glass, soda lime borosilicate glass, fly ash, ceramic, polystyrene, other polymeric materials, and mixtures thereof. In some embodiments of the lightweight cementitious settable compositions of the present invention, the microspheres are hollow, glass microspheres. In some embodiments, the microspheres may comprise a crosslinked polymeric material, such as polystyrene crosslinked with divinyl benzene (e.g., plastic beads). The microspheres may be obtained from any suitable source. Suitable hollow, soda lime borosilicate glass microspheres include 3M™ SCOTCHLITE™ glass bubbles. In a preferred embodiment, borosilicate glass microspheres (3M™ beads) produced by the 3M™ company can be beneficially used to produce lightweight cementitious settable compositions that produce enhanced 24 h compressing strengths.

In an embodiment of the invention, the microspheres may be added in the cement finish mill, in the cement separator, in the cement cooler or by using a separate blender from the cement grinding operation. In these embodiments, the resulting premix would include microspheres before being delivered to the user. Alternatively, in another embodiment, microspheres may be blended with the cementitious binder/premix by the user to further lower the density of the cementitious settable composition, for example, to obtain a density lower than about 10 ppg (1198 kg/m3), or lower than about 9 ppg (1078.4 kg/m3) (for example about 8 ppg (958.6 kg/m3)).

It is envisioned in an embodiment of the invention to foam the cementitious settable composition with a gas to further lower its density. The gas used in the foamed settable compositions according to embodiments of the present invention may be any gas suitable for foaming a cementitious settable composition, including, but not limited to, air, nitrogen, or combinations thereof. Generally, the gas should be present in the foamed cementitious settable compositions according to embodiments of the present invention in an amount sufficient to form the desired foam. The cementitious settable compositions of embodiments of the present invention further include a surfactant. In some embodiments, the surfactant includes a foaming and stabilizing surfactant composition to facilitate the foaming of a cementitious settable composition and to stabilize the resultant foamed cementitious settable composition formed therewith. Any suitable foaming and stabilizing surfactant composition may be used in the cementitious settable compositions according to embodiments of the present invention.

In an embodiment, the cementitious binders are prepared by co-grinding the hydraulic binder (e.g. Portland cement), the first siliceous based material, the second siliceous based material and the optional aluminum based material. However, this is not limiting. It is envisioned that two or more of the materials of the cementitious binder can be co-ground in advance and then mixed with the remaining materials of the cementitious binder. The optional admixtures (e.g. accelerator, plasticizer, retarder, etc.) can be added by a blending process after the finish mill before it goes to the silo or simply blended with a blender or added when preparing the slurry.

Embodiments of the present invention will be further illustrated in more detail using the following, but not limitative, examples. A series of settable cementitious compositions were prepared and cured at various curing temperatures (100 F (38C) (or 38° C.), 140 F (or 60° C.), 180 F (or 83° C.) and 230 F (or 110° C.)). In Tables 9-13, compressive strength results are provided for different curing times (1 day, 3 days, 7 days, 14 days). Results are given for densities in ppg (1 pound/gallon [US]=119.826 426 81 kilogram/cubic meter). Pressures are given in psi (1 pound/square inch=6 894.757 28 pascal). Slurries containing no lightweight additives, such as microspheres, were prepared as per clause 5 of API specification 10B-2 using the type of water or additives specified in each test. Slurries containing lightweight additives, such as microspheres, were prepared as per clause 5 of API specification 10B-2 but limiting the mixer speed to 4000+/−200 rpm to avoid breaking of microspheres. These slurries were also prepared using the type of water or additives specified in each test. The slurries were conditioned to the required temperature for 20 min (plus ramp up time) and poured in 2" cubes. Filling the 2" cubes conformed to clauses 7.5.1 and 7.5.2 of API specification 10B-2. After filling, the cubes were cured in a water bath or autoclave. Samples in a water bath were removed 45 min prior to the age at which they were to be tested and cooled in a water bath at 80 F (27° C.). Samples in an autoclave were cooled to 80 F (27° C.) using a cooling rate of 1 F/min and depressurized slowly (50 psi/min).

In the following embodiments discussed hereinafter, compressive strength measurements are performed in accordance with the standard defined by API Specification 10A, Sec 7, 9. Embodiments are provided for different types of water: sea water and deionized water.

The raw materials and their composition used for the experiments are provided in Table 8. In certain examples described below, bentonite was used to reduce free water of a slurry, while hollow glass bubbles (microspheres) from 3M, with 460 kg/m3 density (code HGS6000), where used to achieve densities below 13 ppg. FP-6L is a defoamer, RET is a sodium lignosulfonate and sodium gluconate based retarder and DIS is a polynapthalene sulfonate dispersant.

"LD" refers to limit of detection. "BSS" refers to blaine specific surface (cm$^2$/g). "LOI" refers to loss on ignition. "OPC" refers to ordinary Portland cement. BET refers to specific surface area (m$^2$/g) and fresh water refers to deionized water (DI). The seawater (SEA) was produced by dissolving 41.953 g of Sea-Salt (from Lake Products Company LLC) in deionised water with enough deionised water added to make one liter total solution. After mixing, the pH was adjusted to 8.2 by using 0.1N solution of either sodium hydroxide or hydrochloric acid.

"BWOC"=by weight of cement
"BWOB"=by weight of binder

TABLE 8

(materials - chemical compositions)

| Category | Product category | SiO2/Al2O3 ratio | BET | Product code | BSS | % of material smaller than 3 μm (wt %) | Chemical composition (% by weight) | | |
|---|---|---|---|---|---|---|---|---|---|
| | | | | | | | SiO$_2$ | Al$_2$O$_3$ | Fe$_2$O$_3$ |
| Hydraulic binder | OPC | | | Base cement no. 1 | 6500 | | 20.94 | 3.40 | 4.63 |
| Hydraulic binder | OPC | | | Microcement 650 | 6500 | | 20.25 | 3.72 | 3.53 |
| Hydraulic binder | OPC | | | Base cement n° 3 | 6500 | | 20.84 | 3.60 | 3.57 |
| Hydraulic binder | OPC | | | Base cement n° 4 | 5500 | | 20.80 | 3.67 | 3.59 |
| 1$^{st}$ siliceous material | Silica flour | 354.1 | 0.6 | SFL coarse | | 9.28 | 99.14 | 0.28 | <LD |
| 1$^{st}$ siliceous material | Silica flour | 224.9 | 2.5 | SFL extra fine | | 40.80 | 98.94 | 0.44 | 0.08 |
| 1$^{st}$ siliceous material | Silica flour | 711.4 | 1.2 | SFL fine | | 9.30 | 99.59 | 0.14 | <LD |
| 1$^{st}$ siliceous material | Pozzolan | 5.9 | 26.1 | Zeolite | | 16.89 | 67.68 | 11.46 | 1.16 |
| 1$^{st}$ siliceous material | Slag | 3.2 | 1.0 | Blast furnace slag | | 26.90 | 35.79 | 11.02 | 0.42 |
| 2$^{nd}$ siliceous material | Silica fume | 409.1 | 24.9 | Silicon SF (ES) | | | 94.10 | 0.23 | 0.16 |
| 2$^{nd}$ siliceous material | Silica fume | 52.6 | 13.2 | Zirconia SF | | | 88.33 | 1.68 | 0.32 |
| 2$^{nd}$ siliceous material | Silica fume | 140.0 | 24.9 | Silicon SF (US) | | | 88.18 | 0.63 | 4.90 |
| 2$^{nd}$ siliceous material | Precipitated silica | 1996.0 | | Aerosil | | | 99.80 | 0.05 | |
| 2$^{nd}$ siliceous material | Rice husk ash | 216.0 | 17.7 | | | | 92.90 | 0.43 | 0.28 |
| Aluminium based material | Metakaolin | 1.2 | 12.1 | | | | 51.70 | 44.37 | 0.42 |
| Aluminium based material | Fly ash | 1.5 | 1.6 | | | | 51.83 | 33.87 | 3.25 |
| Hydraulic binder | OPC | | | Class G (ES) | 3530 | | 21.85 | 3.39 | 4.24 |

| Category | Chemical composition (% by weight) | | | | | | | |
|---|---|---|---|---|---|---|---|---|
| | CaO | MgO | K$_2$O | Na$_2$O | SO$_3$ | TiO$_2$ | LOI | Total |
| Hydraulic binder | 63.70 | 3.00 | 0.25 | 0.15 | 2.48 | 0.24 | 1.19 | 100.09 |
| Hydraulic binder | 63.28 | 1.97 | 0.87 | 0.25 | 3.43 | 0.19 | 1.60 | 99.42 |
| Hydraulic binder | 64.12 | 1.93 | 0.80 | 0.25 | 2.81 | 0.19 | 0.78 | 99.24 |
| Hydraulic binder | 63.81 | 1.96 | 0.78 | 0.26 | 2.91 | 0.19 | 1.50 | 99.39 |
| 1$^{st}$ siliceous material | <LD | <LD | 0.12 | <LD | <LD | <LD | 0.11 | 99.77 |
| 1$^{st}$ siliceous material | 0.04 | | 0.06 | <LD | <LD | 0.03 | 0.56 | 100.24 |
| 1$^{st}$ siliceous material | <LD | <LD | <LD | <LD | <LD | <LD | 0.11 | 99.94 |
| 1$^{st}$ siliceous material | 3.16 | 0.87 | 2.92 | 0.50 | 0.05 | 0.14 | 11.79 | 99.89 |
| 1$^{st}$ siliceous material | 41.47 | 7.69 | 0.45 | 0.22 | 2.21 | 0.58 | 0.00 | 100.46 |
| 2$^{nd}$ siliceous material | 0.56 | 0.23 | 0.41 | 0.15 | <LD | <LD | 3.43 | 99.38 |
| 2$^{nd}$ siliceous material | 0.09 | 0.05 | 0.08 | <LD | <LD | 0.05 | 0.65 | 98.88 |
| 2$^{nd}$ siliceous material | 1.16 | 0.51 | 0.76 | 0.20 | 0.07 | <LD | 2.76 | 99.68 |
| 2$^{nd}$ siliceous material | | | | | | | | 99.85 |
| 2$^{nd}$ siliceous material | 0.74 | 0.43 | 1.5 | 0.06 | 0.08 | 0.03 | 2.94 | 100.51 |
| Aluminium based material | <LD | 0.03 | 0.19 | 0.27 | 0.08 | 1.38 | 1.65 | 100.25 |
| Aluminium based material | 4.27 | 1.19 | 0.63 | 0.31 | 0.50 | 1.69 | 1.07 | 99.88 |
| Hydraulic binder | 64.16 | 1.08 | 0.65 | 0.15 | 2.72 | 0.19 | 0.16 | 0.18 |

Tables 9 and 10 show results with seawater for two different sources of second siliceous based materials (silica fume from zirconia production and silica fume from silicon/ferrosilicon alloy production). The results are provided at different curing temperatures (100 F (38° C.), 140 F (60° C.) and 180 F (83° C.)). FIGS. 8A-B show the corresponding variations of the compressive strength as a function of the $Al_{EFF}/(Al_{EFF}+Si_{EFF})$ ratio at 1 day, 3 days and 7 days, and at 180 F (83° C.). The samples at 1 and 3 days are cured in a water bath while the samples at 7 days are cured in an autoclave. As can be seen in FIG. 8A, best performances at high temperatures for the long term and short term compressive strengths (at 1 day and 3 days) are both obtained for the $Al_{EFF}/(Al_{EFF}+Si_{EFF})$ ratio lower than 0.14 within the desired 0.09-0.28 ratio range. FIG. 8A further shows that the short term and long term compressive strength results at high temperature remain very good (i.e. a compressive strength of at least about 2000 psi (13.8 MPa) is obtained at 180 F (83° C.)–1 day and 3 days) for a ratio as high as 0.14 and decrease for ratio values greater than 0.14, although the compressive strengths values remain high (above 1500 psi (10.3 MPa)). As shown at FIG. 8B, compressive strengths at 7 days decrease for $Al_{EFF}/(Al_{EFF}+Si_{EFF})$ ratio values greater than 0.15.

Tables 9 and 10 further show that short term and long term compressive strengths are excellent over the 0.09-0.28 ranges at low temperatures (lower than 140 F (60° C.)).

TABLE 9

(seawater results)

| $Al_{eff}/(Al_{eff} + Si_{eff})$ | Slurry density | Base cement type | Base cement wt % | Metakaolin wt % | Silica fume type | Silica fume wt % | Silica flour type | Silica flour wt % | Additives (% BWOC) | 1 D 100 F. | 1 D 140 F. |
|---|---|---|---|---|---|---|---|---|---|---|---|
| 0.189 | 12 | Microcement 650 | 71 | 5 | Zirconia SF | 14 | SFL fine | 10 | 0.45% FP-6L 0.5% RET | | |
| 0.121 | 12 | Base Cement 3 | 60 | 5 | Silicon SF (ES) | 18 | SFL coarse | 17 | 0.45% FP-6L 0.4% RET | 922 | 2235 |
| 0.112 | 12 | Base Cement 3 | 60 | 5 | Silicon SF (ES) | 20 | SFL coarse | 15 | 0.45% FP-6L 0.4% RET | 956 | 2479 |
| 0.147 | 12 | Base Cement 3 | 71 | 5 | Silicon SF (ES) | 18 | SFL fine | 6 | 0.45% FP-6L 0.4% RET | | |
| 0.116 | 12 | Base Cement 3 | 60 | 5 | Silicon SF (ES) | 19 | SFL coarse | 16 | 0.45% FP-6L 0.4% RET | | 2523 |
| 0.126 | 12 | Base Cement 4 | 60 | 10 | Silicon SF (ES) | 18 | SFL coarse | 12 | 0.45% FP-6L 0.4% RET | | |
| 0.101 | 12 | Base Cement 4 | 50 | 7 | Silicon SF (ES) | 18 | SFL coarse | 25 | 0.45% FP-6L 0.4% RET | | |
| 0.096 | 12 | Base Cement 4 | 60 | 5 | Silicon SF (ES) | 25 | SFL coarse | 10 | 0.45% FP-6L 0.4% RET | | |

| $Al_{eff}/(Al_{eff} + Si_{eff})$ | 1 D 180 F. | 3 D 100 F. | 3 D 140 F. | 3 D 180 F. | 3 D 220-230 F. | 7 D 100 F. | 7 D 140 F. | 7 D 180 F. | 7 D 220-230 F. | 14 D 180 F. |
|---|---|---|---|---|---|---|---|---|---|---|
| 0.189 | 2243 | | | 1665 | | | | | | |
| 0.121 | 2041 | 2351 | 2727 | 2083 | 1356 (at 230 F.) | 2841 | 2415 | 1985 | 1933 (at 230 F.) | 1811 |
| 0.112 | 2197 | 2441 | 2904 | 2200 | 1530 (at 230 F.) | 3039 | 2505 | 1853 | 1926 (at 230 F.) | 2065 |
| 0.147 | 2235 | | | 1691 | | | | | | |
| 0.116 | 2115 | | 2975 | 2181 | 2130 (at 220 F.) | | 2822 | 2177 | 1897 (at 220 F.) | 2196 |
| 0.126 | 2065 | | | 2143 | | | | | | |
| 0.101 | 1672 | | | 1939 | | | | | | |
| 0.096 | 1868 | | | 2348 | | | | | | |

TABLE 10

(seawater results)

| $Al_{eff}/(Al_{eff} + Si_{eff})$ | Slurry density | Base cement type | Base cement wt % | Metakaolin wt % | Silica fume type | Silica fume wt % | Silica flour type | Silica flour wt % | Additives (% BWOC) | 1 D 100 F. |
|---|---|---|---|---|---|---|---|---|---|---|
| 0.142 | 12 | Base Cement 4 | 68 | 5 | Silicon SF (ES) | 18 | SFL fine | 9 | 0.45% FP-6L 0.8% RET | |
| 0.123 | 12 | Base Cement 4 | 60 | 5 | Silicon SF (ES) | 18 | SFL fine | 17 | 0.45% FP-6L 0.8% RET | |
| 0.131 | 12 | Base Cement 4 | 64 | 3 | Silicon SF (ES) | 18 | SFL fine | 15 | 0.45% FP-6L 0.8% RET | |

TABLE 10-continued (seawater results)

| | | | | | | | | | |
|---|---|---|---|---|---|---|---|---|---|
| 0.130 | 12 | Base Cement 4 | 64 | 0 | Silicon SF (ES) | 18 | SFL fine | 18 | 0.45% FP-6L 0.8% RET |

| $Al_{eff}/$ $(Al_{eff}+Si_{eff})$ | 1 D 140 F. | 1 D 180 F. | 3 D 100 F. | 3 D 140 F. | 3 D 180 F. | 7 D 100 F. | 7 D 140 F. | 7 D 180 F. | 7 D 180 F. (auto-clave) |
|---|---|---|---|---|---|---|---|---|---|
| 0.142 | | | | | | | | | 1540 |
| 0.123 | | | | | | | | | 2310 |
| 0.131 | 1710 | | | | 1514 | | | 1681 | 2002 |
| 0.130 | | | | | | | | 1750 | 1618 |

Tables 11 and 12 show compressive strength results at different temperatures for three different sources of second siliceous based materials (one silica fume from zirconia production and two silica fumes from silicon/ferrosilicon alloy production). FIGS. 9A-B show the corresponding variations of the compressive strength as a function of the $Al_{EFF}/(Al_{EFF}+Si_{EFF})$ ratio at 1 day and 3 days and at high temperature (180 F). FIG. 9A shows the results obtained with silica fume predominantly from zirconia production and FIG. 9B shows the results obtained with the silica fume from silicon/ferrosilicon alloy production. FIG. 9A shows that the short term and long term compressive strength results remain very good (i.e. a compressive strength of at least about 1500 psi (10.3 MPa) to is obtained at 180 F (83° C.)—1 day and 3 days) for a ratio as high as 0.28 and decrease for ratio values greater than 0.28 (e.g. about 0.5). The best performances for silica fume from zirconia production are obtained for a ratio around 0.2. As shown at FIG. 9B, the maximum ratio that is acceptable for silica fume from silicon/ferrosilicon alloy production is at about 0.20 and the best performances are achieved for the ratio within the 0.12-0.15 range.

Tables 11 and 12 further show that short term and long term compressive strengths are excellent over the 0.09-0.28 ranges at low temperatures (lower than 140 F (60° C.)). The last two examples of Table 11 are comparative examples.

TABLE 11

(Fresh water results)

| $Al_{eff}/$ $(Al_{eff}+Si_{eff})$ | Slurry density | Base cement type | Base cement wt % | Meta-kaolin wt % | Silica fume type | Silica fume % | Silica flour type | Silica flour % | Additives (& BWOC) | 1 D 100 F. | 1 D 140 F. | 1 D 180 F. | 3 D 100 F. | 3 D 140 F. | 3 D 180 F. |
|---|---|---|---|---|---|---|---|---|---|---|---|---|---|---|---|
| 0.189 | 12 | Micro-cement 650 | 71 | 5 | Zirconia SF | 14 | SFL fine | 10 | 0.45% FP-6L 0.5% RET | | | 2102 | | | 1921 |
| 0.234 | 12 | Micro-cement 650 | 71 | 5 | Zirconia SF | 10 | SFL fine | 14 | 0.45% FP-6L 0.5% RET | | 837 | 1511 | | 1744 | |
| 0.177 | 12 | Micro-cement 650 | 71 | 5 | Zirconia SF | 10 | SFL extra-fine | 14 | 0.45% FP-6L 0.5% RET | | 1076 | 1854 | | 1968 | 1742 |
| 0.503 | 12 | Base cement no. 1 | 67 | 14 | Silicon SF (US) | 3 | — | — | 0.45% FP-6L | | 807 | | | 1000 | |
| 0.321 | 12.00 | Micro-cement 650 | 86 | 5 | Zirconia SF | 9 | — | — | 0.45% FP-6L 0.36% RET | | 1776 | | | 1445 | |

TABLE 12

(Fresh water results)

| $Al_{eff}/$ $(Al_{eff} + Si_{eff})$ | Slurry density | Base cement type | Base cement wt % | Metakaolin wt % | Silica fume type | Silica fume wt % | Silica flour type | Silica flour wt % | Additives (& BWOC) | 1 D 100 F. | 1 D 140 F. |
|---|---|---|---|---|---|---|---|---|---|---|---|
| 0.159 | 12 | Microcement 650 | 69 | 5 | Silicon SF (ES) | 16 | SFL fine | 10 | 0.45% FP-6L 0.5% RET | | 2071 |
| 0.151 | 12 | Microcement 650 | 71 | 5 | Silicon SF (ES) | 18 | SFL fine | 6 | 0.45% FP-6L 0.5% RET | | 2203 |
| 0.181 | 12 | Microcement 650 | 71 | 5 | Silicon SF (ES) | 14 | SFL fine | 10 | 0.45% FP-6L 0.5% RET | | 1547 |
| 0.153 | 12 | Microcement 650 | 71 | 5 | Silicon SF (ES) | 14 | SFL extra fine | 10 | 0.45% FP-6L 0.5% RET | | 1378 |
| 0.185 | 12 | Microcement 650 | 73 | 3 | Silicon SF (ES) | 14 | SFL fine | 10 | 0.45% FP-6L 0.5% RET | | 1556 |
| 0.121 | 12 | Base Cement 3 | 60 | 5 | Silicon SF (ES) | 18 | SFL coarse | 17 | 0.45% FP-6L 0.2%-0.3% RET | 297 | 1570 |
| 0.112 | 12 | Base Cement 3 | 60 | 5 | Silicon SF (ES) | 20 | SFL coarse | 15 | 0.45% FP-6L 0.2%-0.3% RET | 306 | 1712 |

| $Al_{eff}/$ $(Al_{eff} + Si_{eff})$ | 1 D 180 F. | 3 D 100 F. | 3 D 140 F. | 3 D 180 F. | 3 D 230 F. | 7 D 100 F. | 7 D 140 F. | 7 D 180 F. | 7 D 230 F. | 14 D 180 F. |
|---|---|---|---|---|---|---|---|---|---|---|
| 0.159 | 1701 | | 1933 | 1646 | | | | | | |
| 0.151 | 1861 | | 2303 | 2132 | | | | | | |
| 0.181 | 1622 | | 1761 | 1519 | | | | | | |
| 0.153 | 1709 | | 1782 | 1885 | | | | | | |
| 0.185 | 1796 | | 1732 | 1516 | | | | | | |
| 0.121 | 1712 | 1097 | 2097 | 2160 | 1681 | 1953 | 1967 | 1938 | 2097 | 1868 |
| 0.112 | 1777 | 1182 | 2042 | 1817 | 1749 | 2085 | 2124 | 1991 | 1832 | 1892 |

Table 13 shows compressive strength results at 180 F (83° C.) for different types of second siliceous based materials. Table 13 shows that good results have been achieved when silica fume is fully replaced by rice husk ash or partially replaced by precipitated silica. Table 14 shows compressive strength results at 180 F (83° C.) for different types of first siliceous based materials. Table 14 shows that good results have been achieved when silica flour is fully replaced by pozzolan (natural zeolite) or slag.

Table 15 shows compressive strength results at 180 F (83° C.) for different types of aluminum based materials. Table 15 shows that good results have been achieved when metakaolin is removed or fully replaced by fly ash.

Table 16 shows compressive strength results at 180 F (83° C.) for two different cementitious binders that each provide a cementitious settable composition with a density of 12 ppg (1437.9 kg/m³) and a density of 13 ppg (1557.7 kg/m³) density.

Table 17 shows compressive strength results at 180 F (83° C.) for a cementitious settable composition prepared at 14 ppg (1677.6 kg/m3) density using fresh water or seawater. Both samples show high compressive strength and no strength retrogression.

Table 18 shows a comparison of the compressive strength results at 180 F (83° C.) and 8.7 ppg (1042.5 kg/m3) of two cementitious settable compositions prepared with microspheres at a solid volume fraction (SVF) of 46% (water/binder ratio of 1.6; the binder contains all the cement and cementitious components but not the microspheres). The results show that 50% more strength is achieved with the embodiment of this application compared to the comparative composition made with Class G cement, while using a lower amount of microspheres.

Table 19 shows a comparison of the compressive strength results at 180 F (83° C.) and 12 ppg (1437.9 kg/m3) of two cementitious settable compositions prepared with microspheres at different solid volume fractions (SVF) and thus different water/binder ratios (the binder contains all the cement and cementitious components but not bentonite or microspheres). The results show that a much higher quantity of microspheres is needed in order achieve the same strength for the system based on Class G cement.

TABLE 13

(Sea water results - material substitution)

| $Al_{eff}/$ $(Al_{eff} + Si_{eff})$ | Slurry density | Base cement type | Base cement wt % | Metakaolin wt % | 2$^{nd}$ Siliceous based material type | 2$^{nd}$ Siliceous based material wt % | 1$^{st}$ Siliceous based material type | 1$^{st}$ Siliceous based material wt % | Additives (& BWOC) |
|---|---|---|---|---|---|---|---|---|---|
| 0.121 | 12 | Base Cement 3 | 60 | 5 | Silicon SF (ES) | 18 | SFL coarse | 17 | 0.45% FP-6L 0.4% RET |
| 0.125 | 12 | Base Cement 4 | 60 | 5 | Rice husk ash | 18 | SFL coarse | 17 | 0.45% FP-6L 0.4% RET |
| 0.122 | 12 | Base Cement 4 | 60 | 5 | Silicon SF (ES) (14%) & Precipitated SiO$_2$ (4%) | 18 | SFL coarse | 17 | 0.45% FP-6L 0.4% RET |

| $Al_{eff}/(Al_{eff} + Si_{eff})$ | 1 d 100 F. | 1 D 140 F. | 1 D 180 F. | 3 D 100 F. | 3 D 140 F. | 3 D 180 F. | 7 D 100 F. | 7 D 140 F. | 7 D 180 F. |
|---|---|---|---|---|---|---|---|---|---|
| 0.121 | 922 | 2235 | 2041 | 2351 | 2727 | 2083 | 2841 | 2415 | 1985 |
| 0.125 | | | 2606 | | | 2713 | | | |
| 0.122 | | | 1751 | | | 1953 | | | |

TABLE 14

(Sea water results - material substitution)

| $Al_{eff}/$ $(Al_{eff} + Si_{eff})$ | Slurry density | Base cement type | Base cement wt % | Metakaolin wt % | 2$^{nd}$ Siliceous based material type | 2$^{nd}$ Siliceous based material wt % | 1$^{st}$ Siliceous based material type | 1$^{st}$ Siliceous based material wt % | Additives (& BWOC) |
|---|---|---|---|---|---|---|---|---|---|
| 0.121 | 12 | Base Cement 3 | 60 | 5 | Silicon SF (ES) | 18 | SFL coarse | 17 | 0.45% FP-6L 0.4% RET |
| 0.121 | 12 | Base Cement 4 | 60 | 5 | Silicon SF (ES) | 18 | Pozzolan | 17 | 0.45% FP-6L 0.4% RET |
| 0.139 | 12 | Base Cement 4 | 50 | 5 | Silicon SF (ES) | 10 | Pozzolan | 35 | 0.45% FP-6L 0.4% RET |
| 0.123 | 12 | Base Cement 4 | 60 | 5 | Silicon SF (ES) | 18 | Slag | 17 | 0.45% FP-6L 0.4% RET |

| $Al_{eff}/(Al_{eff} + Si_{eff})$ | 1 D 100 F. | 1 D 140 F. | 1 D 180 F. | 3 D 100 F. | 3 D 140 F. | 3 D 180 F. | 7 D 100 F. | 7 D 140 F. | 7 D 180 F. |
|---|---|---|---|---|---|---|---|---|---|
| 0.121 | 922 | 2235 | 2041 | 2351 | 2727 | 2083 | 2841 | 2415 | 1985 |
| 0.121 | | | 2492 | | | 2676 | | | |
| 0.139 | | | 2598 | | | 2635 | | | |
| 0.123 | | | 1724 | | | 2539 | | | |

TABLE 15

(Sea water results - material substitution)

| $Al_{eff}/(Al_{eff}+Si_{eff})$ | Slurry density | Base cement type | Base cement wt % | Aluminum based material wt % | $2^{nd}$ Siliceous based material type | $2^{nd}$ Siliceous based material wt % | $1^{st}$ Siliceous based material type | $1^{st}$ Siliceous based material wt % | Additives (& BWOC) |
|---|---|---|---|---|---|---|---|---|---|
| 0.121 | 12 | Base Cement 3 | 60 | Metakaolin (5%) | Silicon SF (ES) | 18 | SFL coarse | 17 | 0.45% FP-6L 0.4% RET |
| 0.123 | 12 | Base Cement 4 | 60 | Fly ash (5%) | Silicon SF (ES) | 18 | SFL coarse | 17 | 0.45% FP-6L 0.4% RET |
| 0.120 | 12 | Base Cement 3 | 60 | 0 | Silicon SF (ES) | 18 | SFL coarse | 22 | 0.45% FP-6L 0.4% RET |

| $Al_{eff}/(Al_{eff}+Si_{eff})$ | 1 D 100 F. | 1 D 140 F. | 1 D 180 F. | 3 D 100 F. | 3 D 140 F. | 3 D 180 F. | 7 D 100 F. | 7 D 140 F. | 7 D 180 F. |
|---|---|---|---|---|---|---|---|---|---|
| 0.121 | 922 | 2235 | 2041 | 2351 | 2727 | 2083 | 2841 | 2415 | 1985 |
| 0.123 | | | 1674 | | | 1652 | | | |
| 0.120 | | | 1574 | | | 1721 | | | |

TABLE 16

(Sea water results - different densities)

| $Al_{eff}/(Al_{eff}+Si_{eff})$ | Slurry density (ppg) | Base cement type | Base cement wt % | Metakaolin wt % | $2^{nd}$ Siliceous based material type | $2^{nd}$ Siliceous based material wt % | $1^{st}$ Siliceous based material type | $1^{st}$ Siliceous based material wt % | Additives (& BWOC) |
|---|---|---|---|---|---|---|---|---|---|
| 0.121 | 12 | Base Cement 3 | 60 | 5 | Silicon SF (ES) | 18 | SFL coarse | 17 | 0.45% FP-6L 0.4% RET |
| 0.123 | 13 | Base Cement 4 | 60 | 5 | Silicon SF (ES) | 18 | SFL coarse | 17 | 0.45% FP-6L 1.1% DIS 0.5% RET |
| 0.147 | 12 | Base Cement 3 | 71 | 5 | Silicon SF (ES) | 18 | SFL fine | 6 | 0.45% FP-6L 0.4% RET |
| 0.149 | 13 | Base Cement 4 | 71 | 5 | Silicon SF (ES) | 18 | SFL coarse | 6 | 0.45% FP-6L 1.1% DIS 0.59% RET |

| $Al_{eff}/(Al_{eff}+Si_{eff})$ | 1 D 100 F. | 1 D 140 F. | 1 D 180 F. | 3 D 100 F. | 3 D 140 F. | 3 D 180 F. | 7 D 100 F. | 7 D 140 F. | 7 D 180 F. |
|---|---|---|---|---|---|---|---|---|---|
| 0.121 | 922 | 2235 | 2041 | 2351 | 2727 | 2083 | 2841 | 2415 | 1985 |
| 0.123 | | | 2829 | | | 3028 | | | |
| 0.147 | | | 2235 | | | 1661 | | | |
| 0.149 | | | 3039 | | | 2293 | | | |

TABLE 17

(seawater and fresh water results - 14 ppg)

| $Al_{eff}/$ $Al_{eff} + Si_{eff}$ | Slurry density (ppg) | Water type | Water (% BWOC) | Micro- spheres (% BWOC) | Base cement type | Base cement wt % | Meta- kaolin wt % | $2^{nd}$ Sili- ceous based material type | $2^{nd}$ Sili- ceous based material wt % | $1^{st}$ Sili- ceous based material type | $1^{st}$ Sili- ceous based material wt % | Addi- tives (% BWOC) | 4 HR- 180 F. | 2 HR- 180 F. |
|---|---|---|---|---|---|---|---|---|---|---|---|---|---|---|
| 0.116 | 14 | DI | 0.58 | — | Base Cement 3 | 60 | 5 | Silicon SF (ES) | 19 | SFL coarse | 16 | 0.45% FP-6L 1.1% DIS 0.40% RET | 4375 | 051 |
| 0.116 | 14 | SEA | 0.58 | — | Base Cement 3 | 60 | 5 | Silicon SF (ES) | 18 | SFL coarse | 16 | 0.45% FP-6L 1.1% DIS 0.55% RET | 3577 | 431 |

TABLE 18

(sea water results - Comparison with Class G and microspheres system at 8.7 ppg)

| $Al_{eff}/$ $Al_{eff} + Si_{eff}$ | Slurry density (ppg) | Water type | Water (% BWOB) | Micro- spheres (% BWOC) | Base cement type | Base cement wt % | Meta- kaolin wt % | $2^{nd}$ Sili- ceous based material type | $2^{nd}$ Sili- ceous based material wt % | $1^{st}$ Sili- ceous based material type | $1^{st}$ Sili- ceous based material wt % | Addi- tives (% BWOC) | 24 HR- 180 F. | 72 HR- 180 F. |
|---|---|---|---|---|---|---|---|---|---|---|---|---|---|---|
| 0.116 | 8.7 | SEA | 1.60 | 48.5 | Base Cement 3 | 60 | 5 | Silicon SF (ES) | 19 | SFL coarse | 16 | 0.45% FP-6L 1.1% DIS 0.40% RET | 1804 | |
| 1.000 | 8.7 | SEA | 1.60 | 51.5 | Class G (ES) | 100 | — | — | — | — | — | 0.45% FP-6L | 1273 | |

TABLE 19

(fresh water results - Comparison with Class G and microspheres system at 12 ppg)

| $Al_{eff}/$ $Al_{eff} + Si_{eff}$ | Slurry density (ppg) | Water type | Water (% BWOC) | Micro- spheres (% BWOC) | Base cement type | Base cement wt % | Meta- kaolin wt % | $2^{nd}$ Sili- ceous based material type | $2^{nd}$ Sili- ceous based material wt % | $1^{st}$ Sili- ceous based material type | $1^{st}$ Sili- ceous based material wt % | Addi- tives (% BWOC) | 24 HR- 180 F. | 72 HR- 180 F. |
|---|---|---|---|---|---|---|---|---|---|---|---|---|---|---|
| 0.116 | 12 | DI | 1.11 | — | Base Cement 3 | 60 | 5 | Silicon SF (ES) | 19 | SFL coarse | 16 | 0.45% FP-6L 0.40% RET | 2279 | |
| 1.000 | 12 | DI | 1.18 | — | Class G (ES) | 100 | — | — | — | — | — | 4% ben- tonite 0.45% FP-6L 0.40% DIS 0.05% RET | 588 | |

TABLE 19-continued (fresh water results - Comparison with Class G and microspheres system at 12 ppg)

| $Al_{eff}/$ $Al_{eff}+Si_{eff}$ | Slurry density (ppg) | Water type | Water (% BWOC) | Micro- spheres (% BWOC) | Base cement type | Base cement wt % | Meta- kaolin wt % | $2^{nd}$ Sili- ceous based material type | $2^{nd}$ Sili- ceous based material wt % | $1^{st}$ Sili- ceous based material type | $1^{st}$ Sili- ceous based material wt % | Addi- tives (% BWOC) | 24 HR- 180 F. | 72 HR- 180 F. |
|---|---|---|---|---|---|---|---|---|---|---|---|---|---|---|
| 1.000 | 12 | DI | 0.97 | 5 | Class G (ES) | 100 | — | — | — | — | — | 2% ben- tonite 0.45% FP-6L 0.39% DIS 0.05% RET | 1008 | |
| 1.000 | 12 | DI | 0.73 | 10 | Class G (ES) | 100 | — | — | — | — | — | 2% ben- tonite 0.45% FP-6L 0.37% DIS 0.05% RET | 2212 | |

The cementitious settable compositions according to embodiments of the invention may be used in a variety of applications. For example, the cementitious settable compositions may be used in primary cementing, remedial cementing, and drilling operations.

In accordance with one embodiment of the invention, the cementitious settable composition is introduced in the underground formation in a well bore between a casing and a wall of the well bore to perform primary cementing. In another embodiment, the cementitious settable composition may be introduced in the underground formation to repair the casing and/or to achieve zonal isolation. For example, the cementitious settable to composition may be used for purposes including, but not limited to, sealing off perforations, repairing casing leaks (including leaks from damaged areas of the casing), plugging back or sealing off the lower section of a wellbore, and sealing the interior of a wellbore during abandonment operations. Examples of specific applications include, but are not limited to, cementing casing and liner strings, inflatable packers, squeezing perforations and casing leaks.

It is also envisioned in other embodiments of the invention to use the cementitious settable compositions in applications other than subterranean applications. For example, the cementitious settable compositions may be used in construction cementing where compositions having low densities and enhanced compressive strengths are desired. However, this is not limiting. For example, it is also envisioned in one embodiment of the invention to use the binder to prepare settable compositions at densities greater than about 13 ppg (1557.7 kg/m3) for use in a variety of applications, including surface applications and construction applications.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed compositions and methods may be utilized in various combinations and/or independently. Thus, the invention is not limited to only those combinations shown herein, but rather may include other combinations.

The invention claimed is:

1. A manufactured cementitious binder, comprising:
a hydraulic binder in an amount in the range from 50 to 80% by weight of the cementitious binder;
a first siliceous based material in an amount in the range from 0.5 to 35% by weight of the cementitious binder, the first siliceous based material having a $(SiO_2)/(Al_2O_3)$ ratio by weight greater than 2.5;
a second siliceous based material in an amount in the range from 10 to 25% by weight of the cementitious binder, the second siliceous based material being different from the first siliceous based material and having (a) a $(SiO_2)/(Al_2O_3)$ ratio by weight greater than 10 and (b) a BET specific surface area greater than 5 m²/g, the second siliceous based material comprising a mixture of silica fume from zirconia production and another siliceous based material that is selected from the group consisting of precipitated silica, rice husk ash, and mixtures thereof;
an aluminum based material in the range greater than 0% by weight of the cementitious binder and less than 7% by weight of the cementitious binder and having a $(SiO_2)/(Al_2O_3)$ ratio by weight lower than 2.5,
wherein $0.09<Al_{EFF}/(Al_{EFF}+Si_{EFF})<0.28$, where
$Al_{EFF}$=molar content of aluminum in the hydraulic binder, and
$Si_{EFF}$=molar content of silica in the first siliceous based material for particles having a size lower than 3 μm+molar content of silica in the second siliceous based material, and
a lightweight additive in an amount less than 50% by weight of the cementitious binder;
wherein the cementitious binder provides a cementitious settable composition, when added with water, having a density less than 14 pounds per gallon (ppg) (1677.6 kg/m³).

2. The manufactured cementitious binder of claim 1, wherein the first siliceous based material is selected from the group consisting of slag, siliceous pozzolan, silica flour, and mixtures thereof.

3. The manufactured cementitious binder of claim 1, wherein the aluminum based material is selected from the group consisting of metakaolin, calcined clay, fly ash, aluminum based natural pozzolan and mixtures thereof.

4. The manufactured cementitious binder of claim 1, wherein the hydraulic binder in an amount in the range from 55 to 78% by weight of the cementitious binder.

5. The manufactured cementitious binder of claim 1, wherein the first siliceous based material is in an amount in the range from 8 to 30% by weight of the cementitious binder.

6. The manufactured cementitious binder of claim 1, wherein the second siliceous based material is in an amount in the range from 10 to 20% by weight of the cementitious binder.

7. The manufactured cementitious binder of claim 1, wherein the hydraulic binder is Portland cement having a Blaine specific surface (BSS) greater than 4,000 m$^2$/g.

8. The manufactured cementitious binder of claim 1, wherein the hydraulic binder is Portland cement having a SO$_3$ content lower than 6% by weight.

9. The manufactured cementitious binder of claim 1, wherein the cementitious binder provides a cementitious settable composition when added with water, having a 24 hour compressive strength at 180° F. (83° C.), as hardened, of at least 1500 psi (10.3 MPa).

10. A cementitious settable composition comprising:
water; and
a manufactured cementitious binder of claim 1, wherein the cementitious settable composition has a density lower than 14 ppg (1677.6 kg/m$^3$).

11. The cementitious settable composition of claim 10, wherein the cementitious settable composition has a density from 11 ppg (1318 kg/m$^3$) to less than 14 ppg (1677.6 kg/m$^3$).

12. A method of cementing comprising:
providing the cementitious settable composition of claim 10; and
introducing the cementitious settable composition into an underground formation.

13. The method of claim 12, wherein the underground formation is a well bore.

* * * * *

UNITED STATES PATENT AND TRADEMARK OFFICE
CERTIFICATE OF CORRECTION

PATENT NO. : 10,793,764 B2
APPLICATION NO. : 15/568294
DATED : October 6, 2020
INVENTOR(S) : Nikolaos Vlasopoulos et al.

It is certified that error appears in the above-identified patent and that said Letters Patent is hereby corrected as shown below:

In Item (57) Abstract, please amend as follows:
A cementitious binder, includes a hydraulic binder in an amount in the range from 50 to 80% by weight of the cementitious binder; a first siliceous based material in an amount in the range from 0.5 to 35% by weight of the cementitious binder, the first siliceous based material having a $(SiO_2)/(Al_2O_3)$ ratio by weight greater than 2.5; a second siliceous based material in an amount in the range from 10 to 25% by weight of the cementitious binder, the second siliceous based material being different from the first siliceous based material and having (a) a $(SiO_2)/(Al_2O_3)$ ratio by weight greater than 10 and (b) a BET specific surface area greater than 5 $m^2/g$; and an aluminum based material in the range from 0 to 10% by weight of the cementitious binder and having a $(SiO_2)/(Al_2O_3)$ ratio by weight lower than 2.5, wherein $0.09 < Al_{EFF}/(Al_{EFF}+Si_{EFF}) < 0.28$, where $Al_{EFF}$ = molar content of aluminum in the hydraulic binder, and $Si_{EFF}$ = molar content of silica in the first siliceous based material for particles having a size lower than 3μm + molar content of silica in the second siliceous based material.

Signed and Sealed this
Eighth Day of December, 2020

Andrei Iancu
*Director of the United States Patent and Trademark Office*